US009141846B2

(12) United States Patent
Aoki

(10) Patent No.: US 9,141,846 B2
(45) Date of Patent: Sep. 22, 2015

(54) IMAGE PROCESSING DEVICE, IMAGE PROCESSING SYSTEM, IMAGE PROCESSING METHOD, AND RECORDING MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 14/012,614

(22) Filed: Aug. 28, 2013

(65) Prior Publication Data
US 2014/0133709 A1    May 15, 2014

(30) Foreign Application Priority Data

Nov. 14, 2012 (JP) .................................. 2012-250704

(51) Int. Cl.
G06K 9/36 (2006.01)
G06K 9/00 (2006.01)
G06K 9/20 (2006.01)
G06K 9/40 (2006.01)

(52) U.S. Cl.
CPC ........ *G06K 9/00033* (2013.01); *G06K 9/00885* (2013.01); *G06K 9/209* (2013.01); *G06K 9/40* (2013.01); *G06K 9/00026* (2013.01); *G06K 2009/00932* (2013.01)

(58) Field of Classification Search
None
See application file for complete search history.

(56) References Cited

U.S. PATENT DOCUMENTS

| 2002/0082497 | A1* | 6/2002 | Song | 600/410 |
|---|---|---|---|---|
| 2005/0104968 | A1 | 5/2005 | Aoki et al. | |
| 2006/0256226 | A1 | 11/2006 | Alon et al. | |
| 2006/0290781 | A1 | 12/2006 | Hama | |
| 2008/0186475 | A1* | 8/2008 | Kawata et al. | 356/73 |
| 2012/0099001 | A1* | 4/2012 | Oyama | 348/234 |

FOREIGN PATENT DOCUMENTS

| JP | 10-197214 | 7/1998 |
|---|---|---|
| JP | 11-231223 | 8/1999 |
| JP | 2002-71310 | 3/2002 |
| JP | 2006-519527 | 8/2006 |
| JP | 2007-10346 | 1/2007 |
| WO | WO 2004/084140 | 9/2004 |

OTHER PUBLICATIONS

P. van der Zee et al., "Computed Point Spread Functions for Light in Tissue Using a Measured Volume Scattering Function," Advances in Experimental Medicine and Biology, vol. 222, pp. 191-197, Oxygen Transport to Tissue X, 1988.

(Continued)

Primary Examiner — Daniel Mariam
(74) Attorney, Agent, or Firm — Staas & Halsey LLP

(57) ABSTRACT

An image processing device includes a memory; and a processor coupled to the memory and configured to: acquire, for each of different entrance positions, each of captured images generated by changing the luminance of pixels within a given distance from an entrance position indicating a location at which light is incident to a photographic subject, the pixels being in an image obtained by illuminating the photographic subject with the light from a light source and capturing the light reflected from the photographic subject, generate a composite image by adding together each of the captured images, and generate an output image by performing image restoration on the composite image by using a model having the shape of the reflected light.

13 Claims, 27 Drawing Sheets

(56) References Cited

OTHER PUBLICATIONS

R. Araki et al., "Near-Infrared Imaging In Vivo: Imaging of Hb Oxygenation in Living Tissues," SPIE vol. 1431 Time-Resolved Spectroscopy and Imaging of Tissues (1991), pp. 321-332.

T. Nakai et al., "Expression of Optical Diffusion Coefficient in High-Absorption Turbid Media," Phys. Med. Biol 42 (1997), pp. 2541-2549.

D. J. Bicout et al., "A Measure of Photon Penetration into Tissue in Diffusion Models," Optics Communications, vol. 158, 1998, pp. 213-220.

* cited by examiner

FIG. 2

|  | REFRACTIVE INDEX (n) | ABSORPTION INDEX $\mu a[1/cm]$ | SCATTERING COEFFICIENT $\mu s[1/cm]$ | ANISOTROPIC PARAMETER g |
|---|---|---|---|---|
| AIR LAYER | 1.0 | 0.000 | 0.000 | 1.00 |
| LIVING BODY LAYER | 1.4 | 0.100 | 200.0 | 0.90 |

SCATTERING

IMAGE PROCESSING DEVICE, IMAGE PROCESSING SYSTEM, IMAGE PROCESSING METHOD, AND RECORDING MEDIUM

CROSS-REFERENCE TO RELATED APPLICATION

This application is based upon and claims the benefit of priority of the prior Japanese Patent Application No. 2012-250704, filed on Nov. 14, 2012, the entire contents of which are incorporated herein by reference.

FIELD

The embodiments discussed herein are related to an image processing device, an image processing system, an image processing method, and a recording medium for processing a captured image.

BACKGROUND

There is an imaging device in which a living body is illuminated with electromagnetic waves, such as near-infrared rays, and then an image of the electromagnetic waves that have passed through the living body or have been diffusely reflected by the living body is captured, so that internal body information (such as blood vessel patterns of the living body) is acquired. The imaging device is mainly used for personal authentication systems that use biometric information.

There are technologies for reducing blurs caused by scattering caused by the living body in an imaging device that acquires internal body information. For example, there is a technology in which electromagnetic waves are caused to pass through a living body, an image of the electromagnetic waves that have passed through the living body is captured, and image reconstruction processing is applied to the captured image, so that the influence of scattering caused by the living body is reduced and thus a captured image of the internals of a body is obtained (see "Near-infrared imaging in vivo: imaging of Hb oxygenation in living tissues", SPIE Vol. 1431 Time-Resolved Spectroscopy and Imaging of Tissues (1991) pages 321-332, Ryuichiro Araki and Ichiro Nashimoto, for example). The technology is a transmission-type technology.

Unfortunately, in the related art technologies, it has proved difficult to capture a clearer image of the inside of a photographic subject that exhibits a light scattering property. Photographic subjects exhibiting a light scattering property include a living body that scatters infrared light.

The reason why it is difficult to capture a clear image is that light is scattered when passing through the inside of a photographic subject and therefore it is difficult to obtain information on portions of the inside located at a depth equal to or greater than a given level, as an image, and spatial information is lost. Here, diffuse reflection will be described.

Some of the light applied to a photographic subject is reflected by the surface of the photographic subject in accordance with Fresnel's formula. Fresnel reflection is reflection that occurs because of the difference in the refractive index between the photographic subject and the medium (such as air). The remaining light for which Fresnel reflection has not occurred penetrates inside the living body.

Inside a photographic subject exhibiting a light scattering property (a body exhibiting a light scattering property is hereinafter also referred to as a "scatterer"), light is not able to travel linearly, and travels while continuously changing travelling direction. FIG. 1 illustrates an example simulation result of propagation of light inside of a living body.

The example illustrated in FIG. 1 illustrates the manner in which one photon that has entered a living body travels. FIG. 2 is a table listing the simulation conditions of the simulation illustrated in FIG. 1. As illustrated in FIG. 2, the refractive index, the absorption index, the scattering coefficient, and the anisotropic parameter are set for both the air layer and the living body layer. Each condition is described below.

(1) Refractive index n: the refractive index is a value obtained by dividing the velocity of light in a vacuum by the velocity of light in matter (namely, phase velocity), and is an index used to describe how light travels through matter.

(2) Absorption coefficient $\mu_a$: the absorption coefficient is a constant representing to what extent a medium absorbs light when the light enters the medium. Given that the intensity of light at the time of entrance into a medium is $I_0$, and the intensity of light when light travels a distance x is I (x), the following expression (1) holds in accordance with Lambert-Beer's law.

$$I(x)=I_0 e^{-\mu_a x} \quad (1)$$

When light travels inside a medium, the intensity of light decreases exponentially with respect to the distance traveled. The coefficient for the exponential decrease is absorption-index $\mu_a$.

(3) Scattering coefficient $\mu_s$: the scattering coefficient is a coefficient indicating the proportion of scattering when light propagates through a medium. Scattering may be expressed with the same formula as with the above absorption coefficient. Given that $\mu_s$ is a scattering coefficient, the intensity I of light that has traveled straight in a medium without being scattered may be represented by the following expression (2).

$$I(x)=I_0 e^{-\mu_s x} \quad (2)$$

When light travels inside a medium, the intensity of light decreases exponentially because of scattering. The coefficient for the exponential decrease is the scattering coefficient $\mu$.

(4) Anisotropic parameter g: the above scattering coefficient (that is, $\mu_s$) indicates the frequency (probability) at which scattering occurs. In contrast, an anisotropic parameter g is a parameter indicating a direction to which the direction in which light travels is changed by scattering. FIG. 3 illustrates the scattering direction $\theta$ of light. The anisotropic parameter g is the average of cos $\theta$ given that the scattering angle is $\theta$. The average of cos $\theta$ is denoted by <cos $\theta$>.

$$g=<\cos \theta> \quad (3)$$

<cos $\theta$>: average of cos $\theta$

FIG. 1 illustrates the result of a simulation of the motion of a photon under the above three conditions, that is, under the conditions that the probability of absorption is determined by $\mu_a$, the probability of scattering is determined by $\mu_s$, and the direction of scattering is determined by g.

As illustrated in FIG. 1, an image that is a signal acquired as the result of scattering of light inside the scatterer is in a blurred state. Accordingly, in related art technologies, it has proved difficult to obtain a clear image acquired at a depth equal to or greater than some value (2 to 3 mm) in the scatterer.

One technology using a captured image inside a photographic subject is palm vein authentication. For example, in a common imaging scheme used in palm vein authentication, it is possible to capture an image of veins at a depth of several millimeters (for example, 2 to 3 mm) below the skin. The common imaging scheme utilizes a near-infrared diffusion light source.

However, if the image of a blood vessel at a location that is deeper (for example, 3 to 7 mm) from the surface is able to be captured, authentication accuracy might significantly improve. This is because the amount of information used for authentication increases.

If information about a deep location under the skin is able to be clearly visualized, it may be possible to utilize the visualization for an injection assisting device that displays the locations of blood vessels for injection assistance, or detection of other pathological changes. Moreover, with regard to food such as meat, capturing an image of information on a deep location may enable visualization to be utilized for foreign substance inspection in food.

Accordingly, it is desirable that information on a location deeper than a depth captured by related art technology be able to be acquired as an image, for a photographic subject exhibiting a light scattering property.

SUMMARY

According to an aspect of the invention, an image processing device includes a memory; and a processor coupled to the memory and configured to: acquire, for each of different entrance positions, each of captured images generated by changing the luminance of pixels within a given distance from an entrance position indicating a location at which light is incident to a photographic subject, the pixels being in an image obtained by illuminating the photographic subject with the light from a light source and capturing the light reflected from the photographic subject, generate a composite image by adding together each of the captured images, and generate an output image by performing image restoration on the composite image by using a model having the shape of the reflected light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table listing the simulation conditions of the simulation illustrated in FIG. 1;

DESCRIPTION OF EMBODIMENTS

The technology upon which embodiments are premised will be described first.

Figure 1:
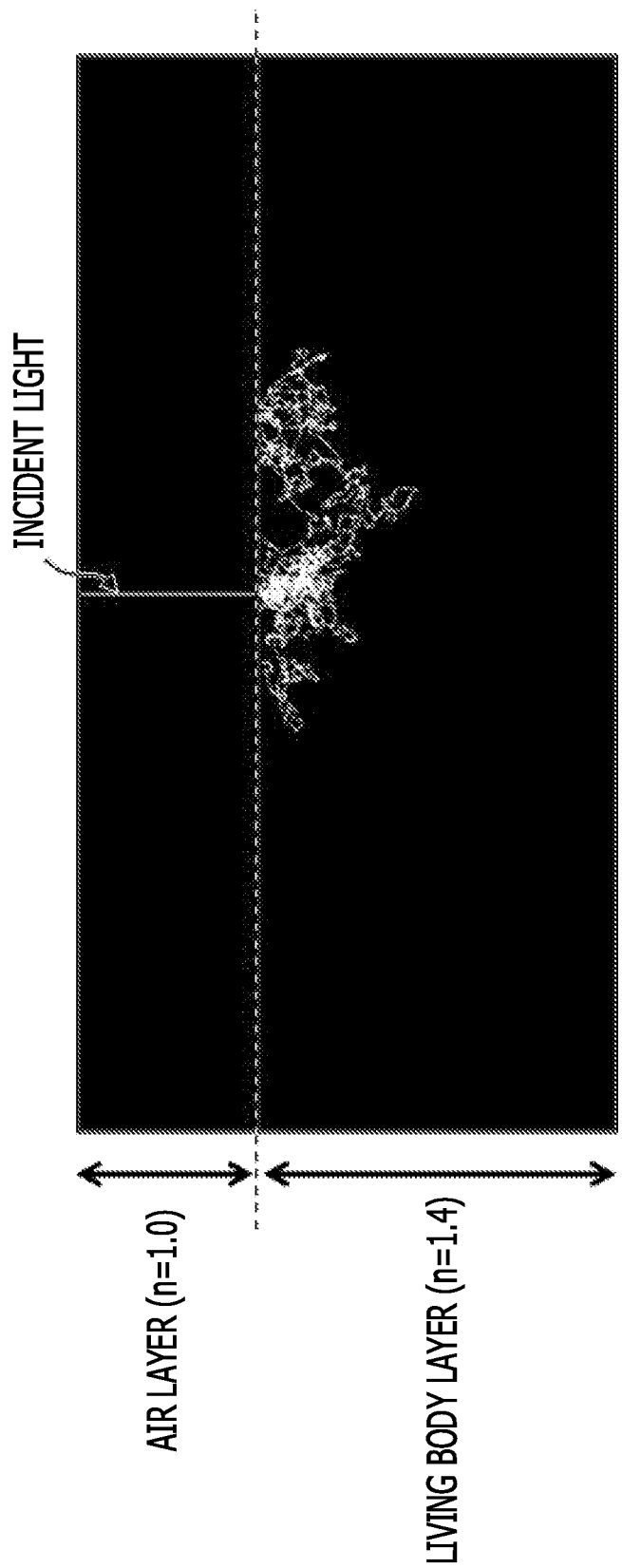
FIG. 1 illustrates an example simulation result of propagation of light inside of a living body.
Figure 3:
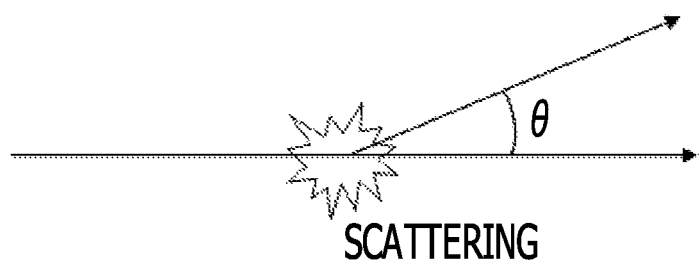
FIG. 3 illustrates the scattering direction $\theta$ of light.
Figure 4:
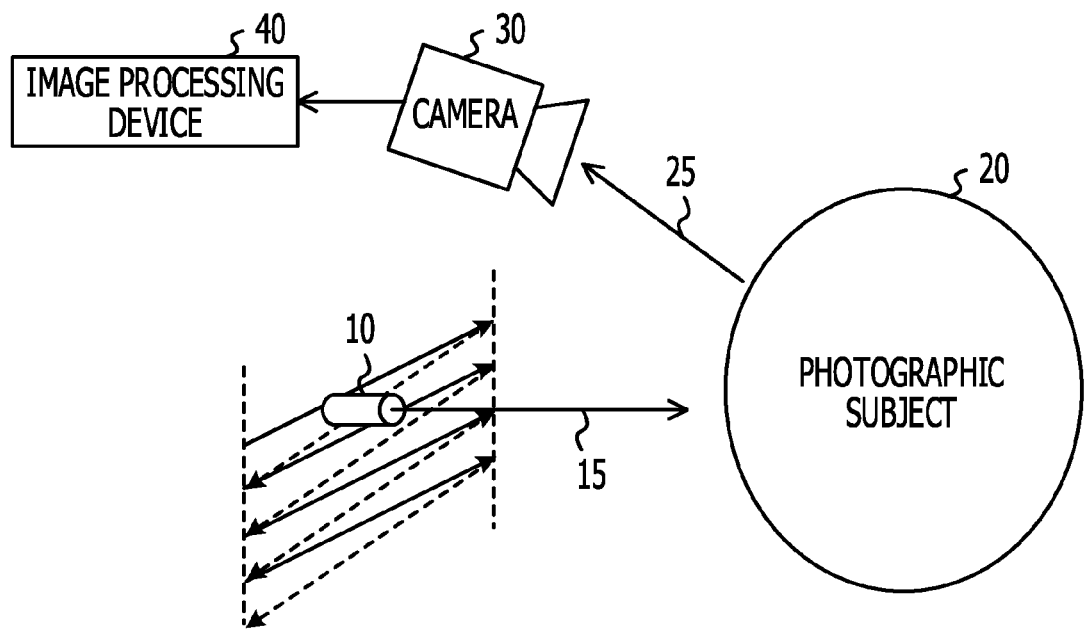
FIG. 4 illustrates an example imaging scheme according to an embodiment.

FIG. 4 illustrates an example imaging scheme in the embodiments. In the imaging scheme illustrated in FIG. 4, a so-called reflection-type technology in which a camera 30 and lighting 10 are placed approximately at the same position with respect to a photographic subject 20 is used. The photographic subject 20 exhibits a light scattering property.

In a general imaging scheme, diffused lighting with which the entire photographic subject is uniformly illuminated is used. In contrast, in the embodiments, a light source (also referred to as "lighting") 10 having a limited illumination area, such as a spot light source (dotted light), is used. In the embodiments, incoming light 15 emitted from the light source 10 is applied to the photographic subject 20. The camera 30 captures an image of outgoing light 25 emitted from the photographic subject 20 while changing the illumination position of the light source 10 (or the photographic subject 20).

An image processing device 40 acquires the images captured at all the positions of the light source 10, and accumulates them. The image processing device 40 performs image preprocessing on each captured image, if desired. The image processing device 40 adds together the images which have undergone preprocessing to generate a composite image. The image processing device 40 applies image reconstruction processing (also referred to as "image correction processing") to the composite image to generate an output image. The reason why such an imaging scheme is adopted will be described next.

In the embodiments, a light source having a limited illumination area rather than diffused light with which the photographic subject 20 is uniformly illuminated is used as the light source 10. As this light source, a spot light source, a line light source, or a lattice dot-like light source may be used, for example.

The light source 10 illuminates the photographic subject 20 while changing the illumination position using a stage or other drive mechanisms so as to scan the entire imaging area of the photographic subject 20 serving as the target. At this point, the images captured by the camera 30 are accumulated by the image processing device 40.

Here, the reason why the light source 10 having a limited illumination area is used will be described, taking a spot light source as an example. Light that has entered the photographic subject 20, which exhibits scattering of light, repeatedly scatters and finally arrives at the camera 30, and is captured as an image.

Figure 5:
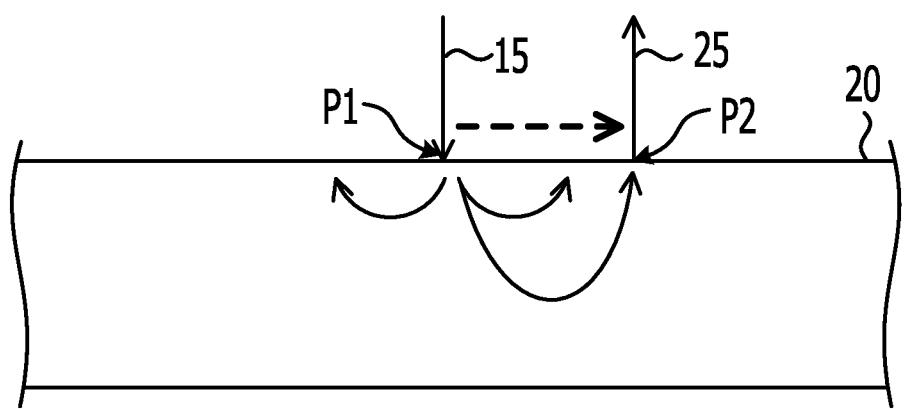
FIG. 5 illustrates the relationship between the distance from the illumination position and depth for reflected light.

FIG. 5 illustrates the relationship between distance from the illumination position and depth for reflected light. In the example illustrated in FIG. 5, the distance between a position P1 at which the incoming light 15 enters the photographic subject 20 (hereinafter referred to as an "entrance position") and a position P2 at which reflected light 25 is emitted from the photographic subject 20 (hereinafter referred to as an "exit position") is given as r. At this point, what depth the photons detected at the distance r reached on average is determined by simulation. Hereinafter, the average depth is denoted by <z>.

Figure 6:
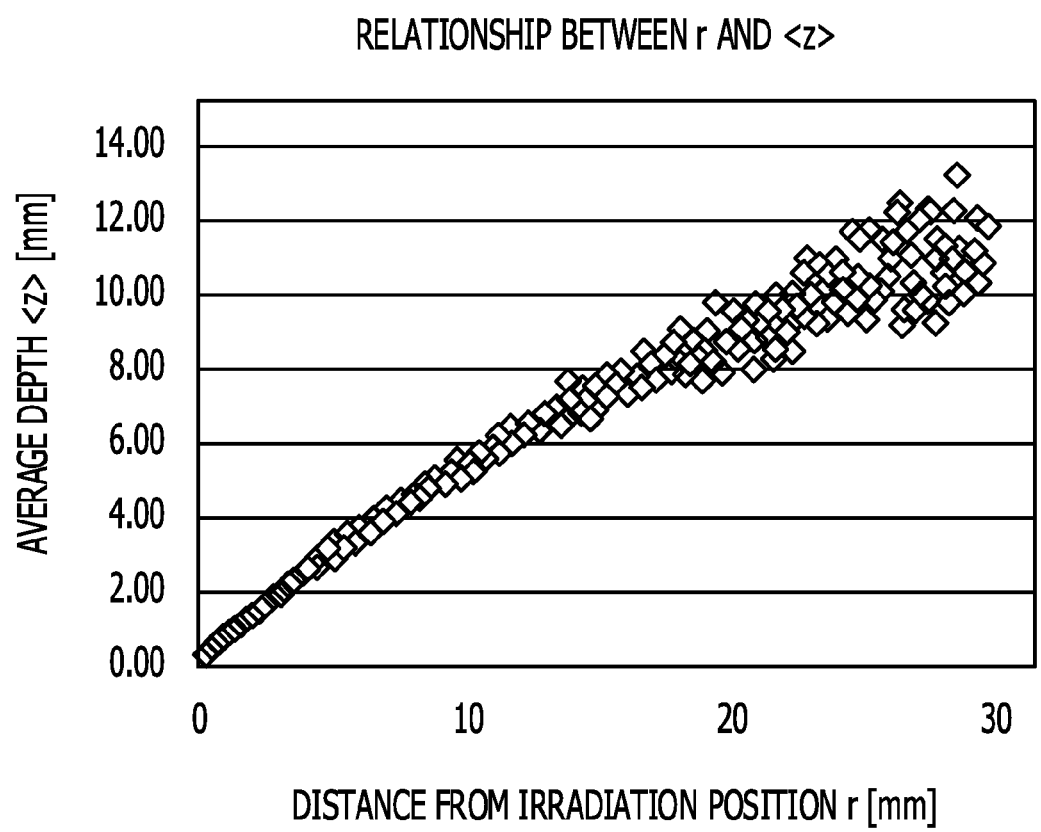
FIG. 6 is a graph illustrating an example simulation result for examining the relationship between distance and depth.

FIG. 6 is a graph illustrating an example simulation result for examining the relationship between the distance and the depth. As illustrated in FIG. 6, it is found that the more distant from the entrance position P1 the position at which light is emitted is, the deeper the photons of the light reach on average.

That is, there is a relationship in which the more distant from the entrance position P1 the position at which light is emitted is, the larger the average depth is. A similar result is described in the document, "A measure of photon penetration into tissue in diffusion models", Optics Communications 158 (1998) 213-220, Dominique J. Bicout, George H. Weiss, which discusses the same issue from a theoretical perspective.

Next, the relationship between distance and depth will be considered for diffuse reflection that occurs when the photographic subject 20 is illuminated by the light source 10.

Figure 7:
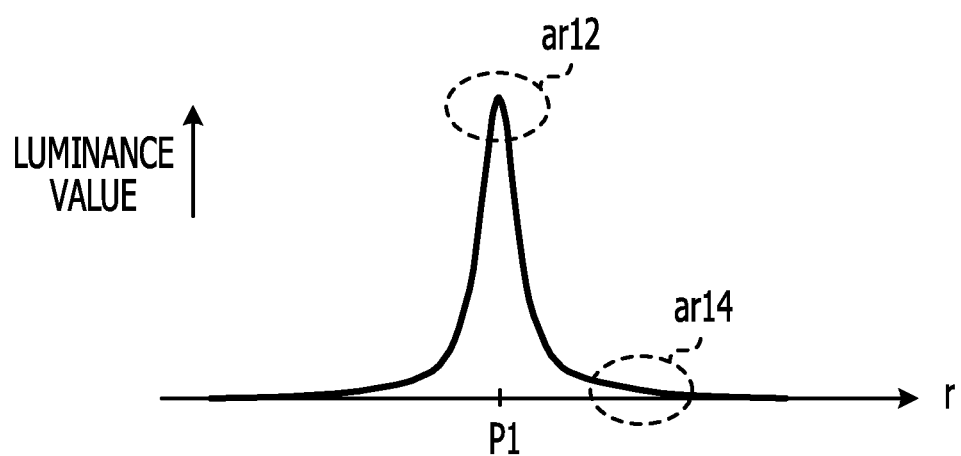
FIG. 7 illustrates the shape of diffuse reflection that occurs when a photographic subject is illuminated by a spot light source.

FIG. 7 illustrates the shape of diffuse reflection that occurs when a spot light source illuminates the photographic subject 20. The horizontal axis illustrated in FIG. 7 represents the distance r from the central illumination position. The vertical axis illustrated in FIG. 7 represents the luminance of the diffuse reflection at the position r.

As illustrated in FIG. 7, the luminance of the reflection is highest in the vicinity of r=P1. The light from an area ar12 in the vicinity of r=P1 only passes through shallow portions of the photographic subject 20. In contrast, the farther r is from P1, the lower the intensity of reflected light.

The light emitted from an area ar14, however, is light that has passed through a position deeper than the position through which light emitted from the area ar12 has passed. In the imaging scheme of the embodiments, information on a deeper position may be clearly obtained by preferentially extracting the light from the deep position.

Advantages of using the light source 10 may be understood by comparing the image of light propagation when typical diffused lighting is used with the image of light propagation when the light source 10 is used.

Figure 8:
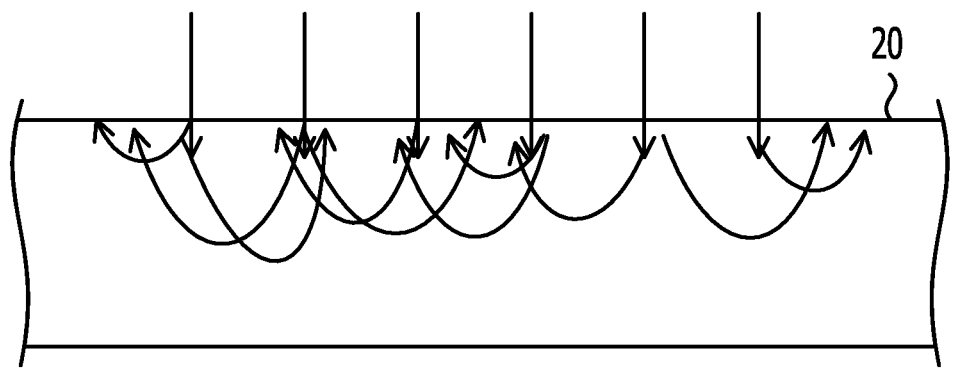
FIG. 8 illustrates an example image of light propagation with diffusion lighting.

FIG. 8 illustrates an example image of light propagation with diffusion lighting. In the example illustrated in FIG. 8, with diffusion lighting, light rays enter the photographic subject 20 at multiple locations. Accordingly, the photographic subject 20 in a state where light rays from various depths exist in a mixed manner is captured by the camera 30.

As illustrated in FIG. 7, in reality, light rays reflected from shallow positions such as the area ar12 account for a high proportion of the all the light rays. Therefore, information on the deep positions such as the area ar14 becomes lost amongst information on the shallow positions.

Figure 9:
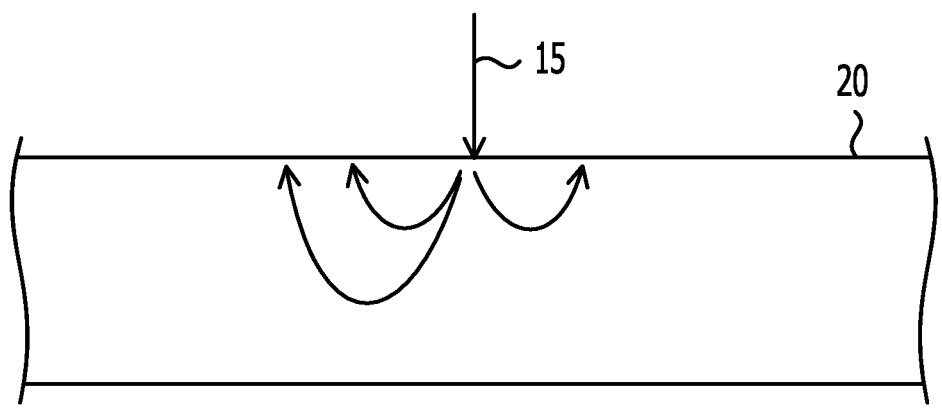
FIG. 9 illustrates an example image of light propagation with a spot light source, which is an example light source.

FIG. 9 illustrates an example image of light propagation with a spot light source, which is an example of the light source 10. As illustrated in FIG. 9, in the embodiments, mixing of light rays may be avoided by using a spot light source.

In particular, light detected near the entrance position is determined to have been emitted from a shallow position. Processing to cut the light or processing to reduce the light may be applied to the embodiments. Accordingly, information at a position deeper than the depth at which an image is not able to be captured in the related art technologies may be obtained.

In the embodiments, a reflection-type configuration in which the camera 30 and the light source 10 are placed approximately at the same position with respect to a photographic subject 20 is used.

This enables an image to be constructed in such a way that the diffused reflected light 25 that has entered the photographic subject 20 is captured by the camera 30, without making the system larger than that of a transmission-type configuration.

Figure 10:
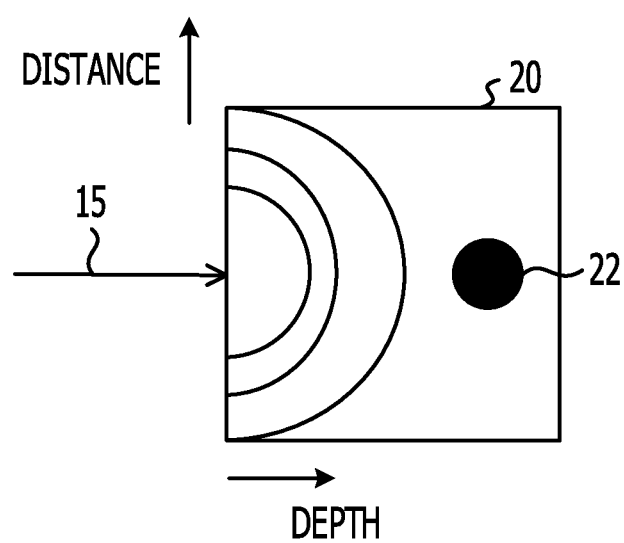
FIG. 10 illustrates an example cross section of a photographic subject with a transmission-type.

In the transmission-type configuration, the entrance position and the exit position of light are separated from each other within the photographic subject. FIG. 10 illustrates an example section of the photographic subject 20 with the transmission-type configuration. In the example illustrated in FIG. 10, internal information 22 exists in the photographic subject 20. When the photographic subject 20 is food, the internal information 22 is a foreign substance, for example. When the photographic subject 20 is a living body, the internal information 22 is blood vessels, for example. As illustrated in FIG. 10, with the transmission-type configuration, the location at which light passing through the photographic subject 20 entered is not found. For this reason, the relationship (information about the distance r and the depth <z>) illustrated in FIG. 6 is lost.

In order to use the transmission-type configuration, it is desirable that the photographic subject 20 have a thickness less than or equal to a certain level. For this reason, the cases where the transmission-type configuration may be applied are very limited.

Figure 11:
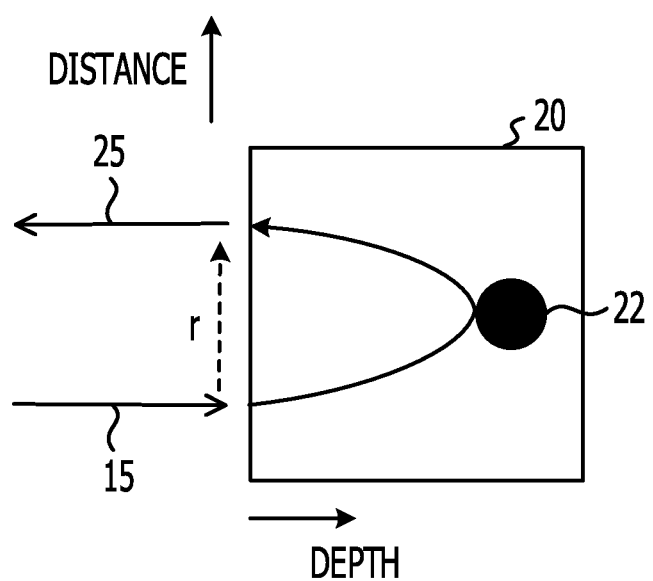
FIG. 11 illustrates an example cross section of a photographic subject with a reflection-type.

Accordingly, a reflection-type configuration is used in the embodiments. FIG. 11 illustrates an example cross-section of the photographic subject with the reflection-type configuration. As illustrated in FIG. 11, in the reflection-type configuration, the entrance position and the exit position are close to one another. For this reason, the relationship "light near the entrance position=light from a shallow place" may be used. By decreasing the luminance of light emitted from a shallow position by preprocessing of an image, or the like information on positions deeper than in the conventional case may be clearly obtained.

Unlike the transmission-type configuration, the reflection-type configuration may be applied independently of the thickness of the photographic subject 20. With the reflection-type configuration, the photographic subject 20 may be set at an arbitrary position. With the transmission-type configuration, the photographic subject 20 has to be placed between the light source 10 and the camera 30. For this reason, the flexibility of the photographic subject 20 is restricted. In contrast, with the reflection-type configuration, the position of the photographic subject 20 may be freely set.

Image reconstruction processing performed by the image processing device 40 will be described next. Image reconstruction processing is a technique for restoring an image from a degraded state that has occurred because of blurring or the like. In particular, image reconstruction processing is a technique that uses a point spread function (PSF), which indicates how an image of the entered point light source is captured by a camera, to calculate how the image was before deterioration from the PSF and the captured image.

Given that a captured image is g(x, y), the original image (in reality, not available) is f(x, y), and the PSF for the entire imaging system is h(x, y), the below relational expression holds.

$$g(x,y)=f(x,y)*h(x,y) \quad (4)$$

where operator * denotes a convolution.

The PSF is appropriately set by the degradation factors of an image. For example, in the field of image processing, a Gaussian function and the like are assumed in many cases. In order to determine the original image f(x, y), it is important to set a PSF appropriately. However, it is usually impossible to accurately determine a PSF in many cases.

Here, various schemes for solving expression (4) for f(x, y) are known. The simplest scheme is to perform Fourier transform on expression (4). Using the convolution theorem enables a convolution operation to be replaced with a simple product.

That is, given that the Fourier transform of g(x, y) is G(j, k), the Fourier transform of f(x, y) is F(j, k), and the Fourier transform of h(x, y) is H(j, k), expression (4) is transformed as follows.

$$G(j,k)=F(j,k)\cdot H(j,k) \quad (5)$$

Expression (5) is solved for F( ) and an inverse Fourier transform is performed, so that f( ) is calculated (inverted filter method).

However, division is used when Expression (5) is solved for F( ). At this point, division by zero may occur. This is a problem that occurs because noise of an image is not taken into consideration when expression (4) is set.

In contrast, the scheme in which normal noise is assumed for an image and image reconstruction is applied is a scheme called Wiener filter. In addition to the above, a scheme (Richardson-Lucy algorithm) in which Bayes estimation is applied and the original image is calculated is also known.

The image processing device 40 adds together all the captured images or the captured images to which preprocessing has been applied, thereby generating a "composite image". Processing of image reconstruction using PSF in accordance with the below expression obtained from the "solution for equation of light diffusion of living body" is applied to the composite image.

$$I(r) = \frac{A}{r}\exp(-Br) \quad (6)$$

Here, r of the above expression represents the distance (square root of $x^2+y^2$) from the illumination position (the spot center with the spot light source) of light. I(r) is equivalent to h(x, y). A and B are constants. B is a constant determined depending on the properties of a photographic subject (details will be described later). In contrast, A is a value uniquely determined from the conditions of normalizing overall PSF functions. In particular, A is determined by the below expression.

$$\iint I(r)dxdy=1.0 \quad (7)$$

In order to cancel the influence of light scattering caused by a living body, the processing to reconstruct an image is applied in the embodiments. In particular, the shape obtained with expression (6) is applied as the shape of reflected light when the light of a point light source enters a photographic subject.

Expression (6) is determined as follows. The propagation of light inside of a scattering body such as a living body may be described using the optical diffusion equation given below (for example, see "Expression of optical diffusion coefficient in high-absorption turbid media" Phys. Med. Biol. 42 (1997) 2541-2549, T Nakai, G Nishimura, K Yamamoto, and M Tamura). The light diffusion equation imposes approximation conditions for diffusion approximation (the scattering direction is uniform) on a more general transport equation.

$$\left(\frac{1}{c}\frac{\partial}{\partial t} - D\nabla^2 + \mu_a\right)\phi(r, t) = S(r, t) \quad (8)$$

where
S (S, t) is a light source;
D is a diffusion constant; and
$\mu_a$ is an absorption constant.

Here, if the reflected light captured by a camera is determined under the light diffusion equation when light enters from the point light source, equation (6) is obtained.

$$A = \frac{S}{4\pi cD} \quad (9)$$

$$B = \sqrt{\frac{\mu_a}{D}} = \sqrt{3\mu_a\mu_s'} \quad (10)$$

The PSF applied in the embodiments uses the shape of reflected light obtained when a uniform object having optical characteristics equivalent to the photographic subject 20 or a homogeneous portion of the photographic subject 20 is illuminated with light of the above point light source. This enables the image processing device 40 to correct blurring of an image.

Embodiments for acquiring information on a location deeper than a given depth as an image, for a photographic subject exhibiting a light scattering property, using the above technologies, will be described with reference to the accompanying drawings.

First Embodiment

The configuration of an image processing system 1 according to a first embodiment will be described first.

Figure 12:
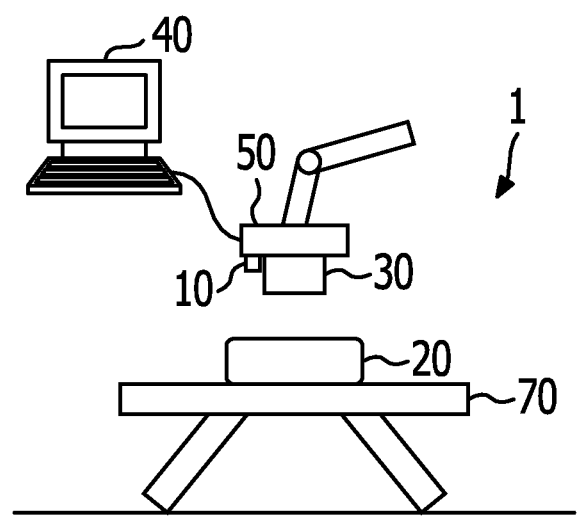
FIG. 12 illustrates an example configuration of an image processing system in a first embodiment.

FIG. 12 illustrates an example configuration of the image processing system 1 in the first embodiment. The image processing system 1 illustrated in FIG. 12 includes the light source 10, the photographic subject 20, the imaging unit 30, the image processing device 40, a platform 50, and a stand 70.

The first embodiment illustrated in FIG. 12 is where the image processing system 1 is used as an imaging device that captures an image of the inside of food or the like. The photographic subject 20 is placed on the stand 70. Light is applied from the light source 10 to the photographic subject 20. The imaging unit 30 captures an image of reflected light from the photographic subject 20, and the image processing device 40 performs given image processing. In this way, a foreign substance and the like included in the photographic subject 20 may be detected. The photographic subject 20 is placed on the stand 70. Accordingly, the distance between the photographic subject 20 and the imaging unit 30 is considered to be approximately fixed.

Figure 13:
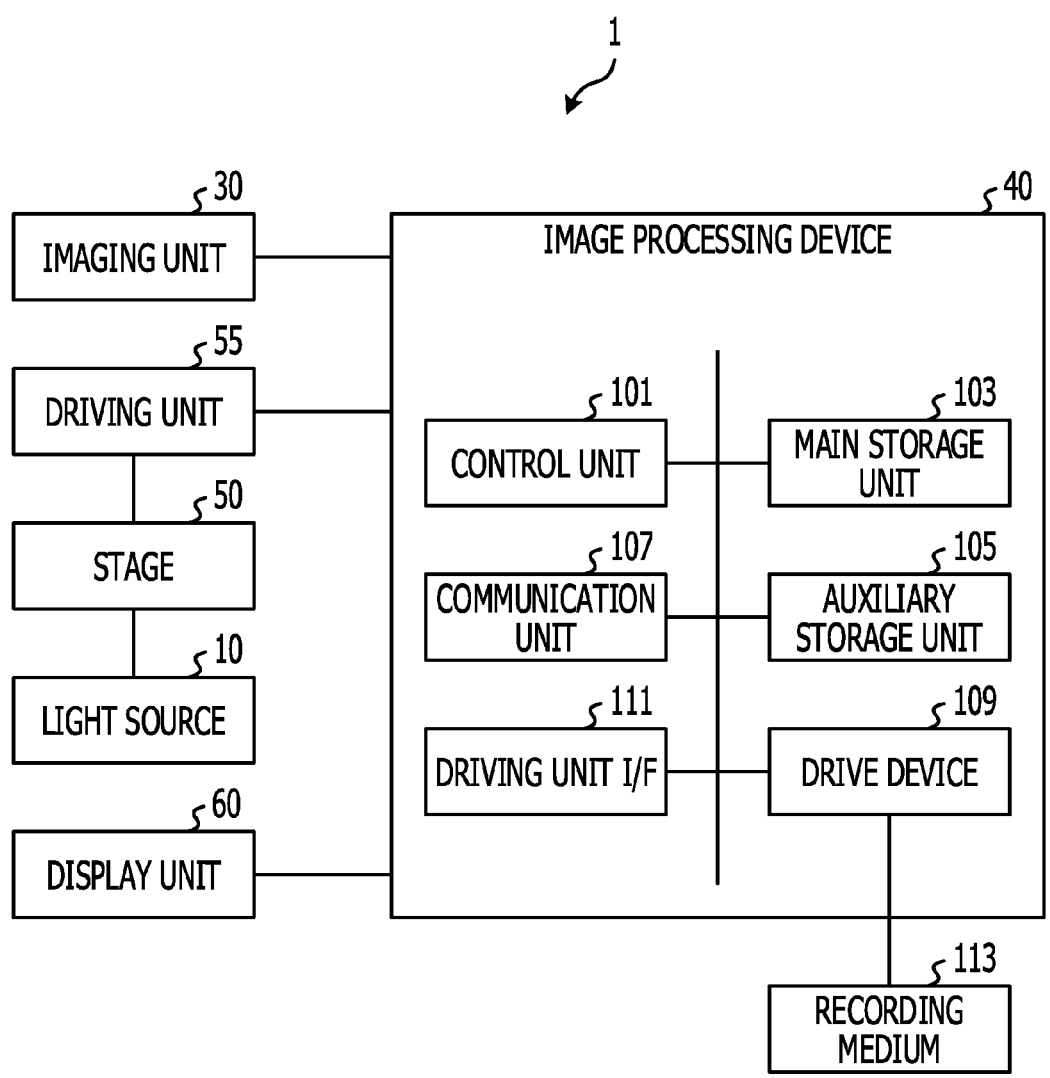
FIG. 13 is a block diagram illustrating example hardware of the image processing system in the first embodiment.

FIG. 13 is a block diagram illustrating example hardware of the image processing system 1 in the first embodiment. The image processing device 40 illustrated in FIG. 13 includes a control unit 101, a main storage unit 103, an auxiliary storage unit 105, a communication unit 107, a drive device 109, and a driver interface (I/F) 111. These units are mutually connected through a data bus so that data communication is possible.

The control unit 101 is a central processing unit (CPU) that controls each device, operations on data, and processing in a computer. The control unit 101 is an arithmetic unit that executes programs stored in the main storage unit 103 and the auxiliary storage unit 105. The control unit 101 receives data from an input device and a storage device, performs operations and processing on the data, and then outputs to an output device or a storage device.

The main storage unit 103 is a read-only memory (ROM), a random access memory (RAM), or the like. The main storage unit 103 is a storage device that stores or temporarily saves programs, such as an operating system (OS), which is basic software, and application software, which is executed by the control unit 101, or data.

The auxiliary storage unit 105 is a hard disk drive (HDD), for example. The auxiliary storage unit 105 is a storage device that stores data relevant to application software or the like. For example, the auxiliary storage unit 105 stores a captured image acquired from the imaging unit 30.

The communication unit 107 performs data communication with peripheral devices in a wired or wireless manner. For example, the communication unit 107 acquires a captured image through a network and stores the captured image in the auxiliary storage unit 105.

The drive device 109 may read an imaging control program described below from the recording medium 113, such as a floppy disk or a compact disc (CD), and may install the imaging control program in a storage device.

The imaging control program is stored in the recording medium 113. The imaging control program stored in the recording medium 113 is installed in the image processing device 40 through the drive device 109. The installed imaging control program is made executable by the image processing device 40.

The driver I/F 111 acquires a control signal for driving the platform 50 from the control unit 101 and notifies a driving unit 55 of the control signal.

The light source 10 is a spot light, for example. The light source 10, specifically, may have a configuration in which laser light and light-emitting diode (LED) light are combined using a condenser. The imaging unit 30 is a camera for capturing an image, and includes a complementary metal-oxide-semiconductor (CMOS) and a charge-coupled device (CCD), for example. The imaging unit 30 may have a configuration in which the imaging unit 30 is included in the image processing device 40.

The driving unit 55 controls the position of the platform 50 by using a control signal from the driving unit I/F 111. For example, the driving unit 55 moves the platform 50 so that the entire photographic subject 30 is illuminated with light from the light source 10.

The platform 50 is a platform on which the light source 10 and the imaging unit 30 are placed, for example. The platform 50 has a stage mechanism with which biaxial scanning of the X direction and the Y direction is possible. This makes it possible to capture an image while moving the illumination positions of the light source 10 in the X and Y directions.

The display unit 60 displays an output image generated by the image processing device 40. The display unit 60 may have a configuration in which the display unit 60 is included in the image processing device 40.

Figure 14:
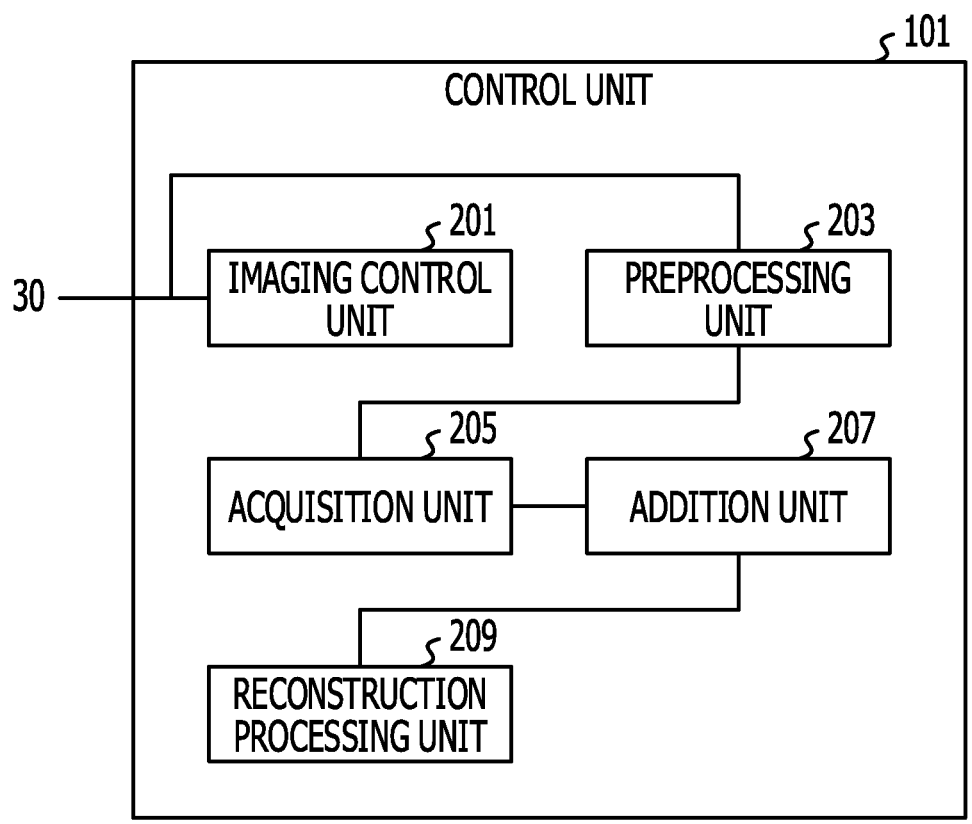
FIG. 14 is a block diagram illustrating example functionality of a control unit of the first embodiment.

FIG. 14 is a block diagram illustrating example functionality of the control unit 101 of the first embodiment. The control unit 101 illustrated in FIG. 14 includes an imaging control unit 201, a preprocessing unit 203, an acquisition unit 205, an addition unit 207, and a reconstruction processing unit 209. Each unit has a function that is loaded onto the main storage unit 103 and becomes executable when an imaging control program is executed by the control unit 101.

The control unit 101 outputs a control signal for the platform 50 to the driving unit 55 via the driving unit I/F 111. Thereby, the illumination position of the light source 10 is caused to scan the entirety of the photographic subject 20. The control unit 101 may perform control so that light is applied from the light source 10 upon movement of the platform 50.

The imaging control unit 201 performs control so that an image is captured by the imaging unit 30, when light is applied from the light source 10. The captured image is subjected to given processing and then is stored in the main storage unit 103 and the auxiliary storage unit 105. The main storage unit 103 and the auxiliary storage unit 105 function as image storage units.

The preprocessing unit 203 acquires a captured image from the imaging unit 30, and reduces the luminance of, or overexposes, pixels of the captured image within a given distance from the position at which light applied from the light source 10 enters the photographic subject 20.

Figure 15:
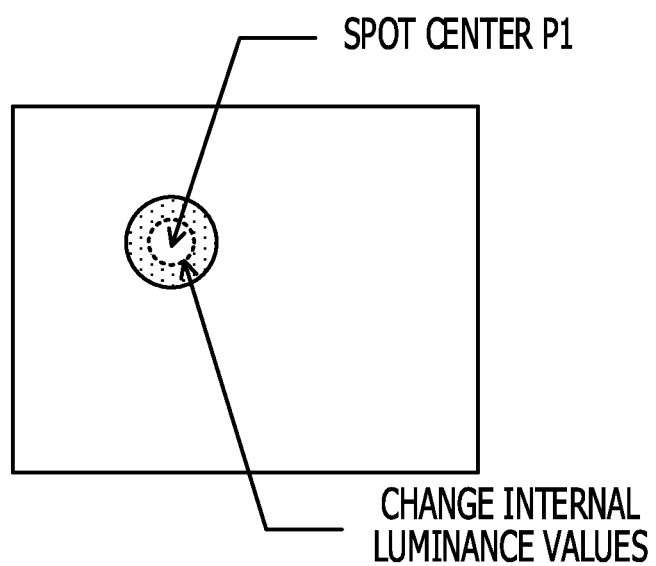
FIG. 15 illustrates example preprocessing.

FIG. 15 illustrates example preprocessing. The preprocessing unit 203 applies processing to lower the luminance at positions near the spot center of the captured image to the captured image. In the example illustrated in FIG. 15, the luminance within a given range from the spot center P1 is lowered. The preprocessing unit 203 may lower the luminance near the spot center by image processing as explained above, or may obtain equivalent effects by intentionally causing overexposure as described later. The preprocessing unit 203 may adjust the depth from the surface of the acquired image by adjusting the given range. The preprocessing unit 203 outputs the captured image, the luminance of which has been changed, to the acquisition unit 205.

Referring back to FIG. 14, the acquisition unit 205 acquires, at each of the entrance positions that differ from one another, an image that is obtained by changing the luminance of pixels within a given distance from the entrance position of an image obtained by illuminating the photographic subject 20 with light from the light source 10 having a limited illumination area and capturing an image of light reflected from the photographic subject 20. In the first embodiment, the acquisition unit 205 acquires each image processed by the preprocessing unit 203.

The addition unit 207 generates a composite image by adding together all the images acquired by the acquisition unit 205. The images captured at the different positions of the light source 10 are added together, and, as a result, the composite image forms a single image in which the photographic subject 20 is captured. The addition unit 207 outputs a composite image to the reconstruction processing unit 209.

The reconstruction processing unit 209 performs image reconstruction processing (image correction processing) on the composite image. For example, the reconstruction processing unit 209 performs image reconstruction processing using expression (6). The reconstruction processing unit 209 may regard the PSF shape as a fixed shape in the first embodiment.

The reconstruction processing unit 209 may set the PSF to a fixed value if the characteristics of a photographic subject are determined to some extent and the distance from the photographic subject 20 to the imaging unit 30 is regarded to be approximately fixed. However, it is desirable for the reconstruction processing unit 209 to appropriately adjust the PSF when the distance to the photographic subject 20 is variable.

In contrast, the reconstruction processing unit 209 appropriately sets the PSF when the shape and material of the photographic subject 20 may be not uniform. Accordingly, the reconstruction processing unit 209 may detect a spot shape from an image captured under illumination with spot light and utilize the shape as the PSF.

The reconstruction processing unit 209 may calculate a PSF so as to fit an image illuminated with spot light to the PSF. The fitting procedure is called image restoration. Hereinafter, an image illuminated with spot light is also referred to as a "spot light image". For example, the reconstruction processing unit 209 may calculate a PSF using fitting so as to make a spot light image suitable for expression (6) rather than directly using the spot light image as a PSF.

The reconstruction processing unit 209 may reduce the influence of noise included in an image and the surface shape by modeling the PSF shape (expression (6)) and then fitting the image to the PSF. That is, when the surface shape of the photographic subject 20 is not flat, the PSF shape significantly distorts if a spot light image is used as it is. However, the influence may be suppressed by fitting the spot light image to the model.

The reconstruction processing unit 209 may measure the photographic subject distance using spot light. In the first embodiment, the photographic subject 20 is illuminated with spot light and then imaged. For this reason, in the first embodiment, it is possible to measure the distance to the position of illumination from spot light by detecting the position of illumination from spot light (see Japanese Patent No. 4015153 and Japanese Patent No. 4644540, for example). The reconstruction processing unit 209 may calculate the distance to the photographic subject 20 and adjust the PSF shape in accordance with the distance.

The reconstruction processing unit 209 may change the PSF depending on the type of the photographic subject 20. In this case, the type of the photographic subject 20 is associated with a PSF in advance, and the reconstruction processing unit 209 may select a PSF in accordance with a type of the photographic subject 20 input by the user or the like.

The image reconstructed by the reconstruction processing unit 209 is stored in the main storage unit 103 or the auxiliary storage unit 105, for example, or is displayed on the display unit 60. The reconstructed image may be normalized by the reconstruction processing unit 209 so that the image has luminance within a given range (from 0 to 255, for example).

With the above functions, information on a location deeper than a given depth may be acquired as an image, for a photographic subject exhibiting a light scattering property.

Figure 16:
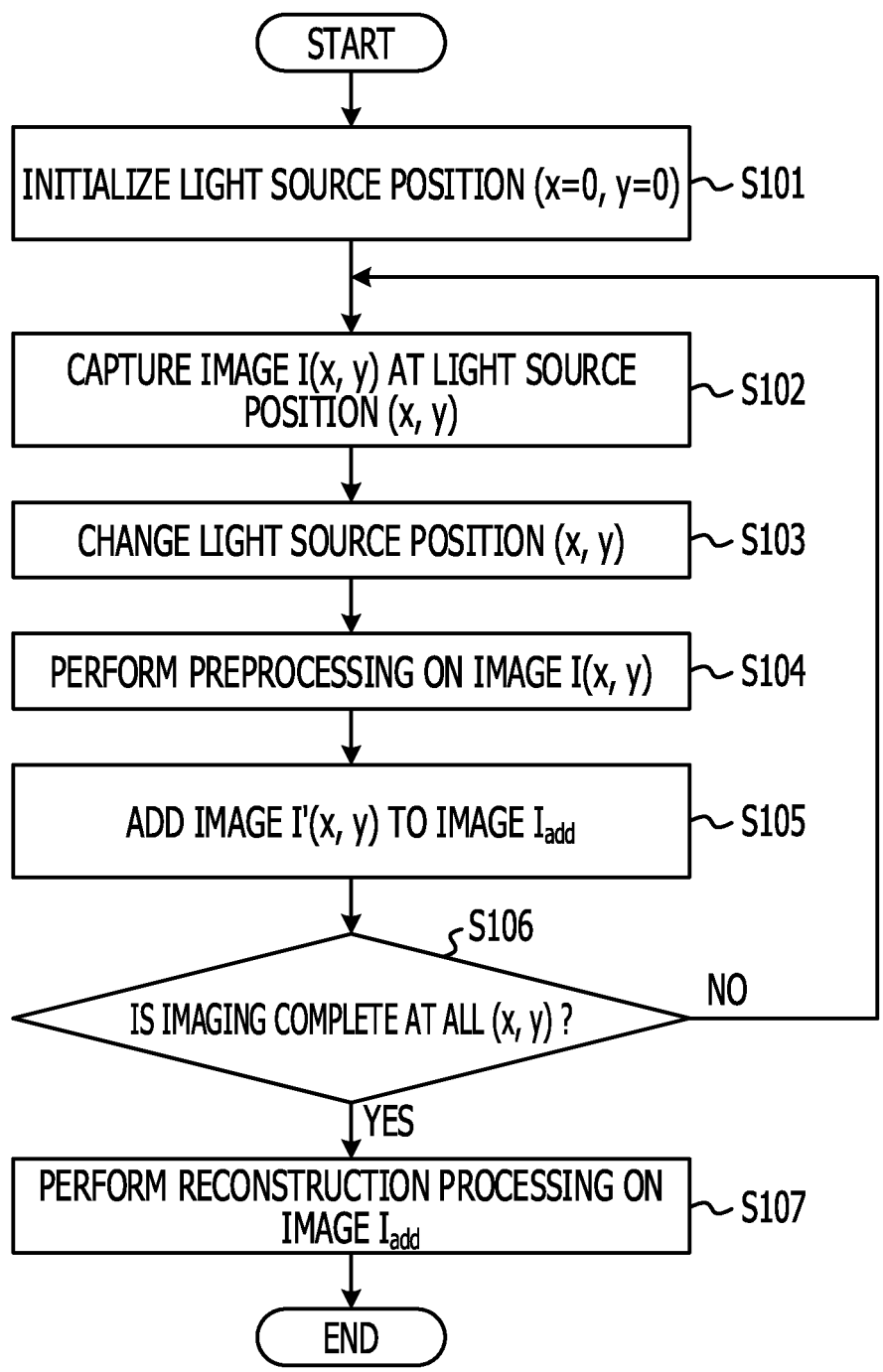
FIG. 16 is a flowchart illustrating example image processing in the first embodiment.

Operations of the image processing system 1 in the first embodiment will be described next. FIG. 16 is a flowchart illustrating example image processing in the first embodiment. In the example illustrated in FIG. 16, it is assumed that a spot light source is used as the light source 10 and images are captured while the light source 10 is being moved in two-axial directions, the X and Y directions, on the platform 50.

In S101 illustrated in FIG. 16, the control unit 101 initializes the position of the light source 10. The position of initialization is set to (x=0, y=0).

In S102, the imaging control unit 201 captures an image I(x, y) at the position of the light source 10. The photographic subject 20 is illuminated with light from the light source 10, and the imaging unit 30 captures an image of diffused reflected light from the photographic subject 20.

In S103, the control unit 101 changes the position of the light source 10. For example, the control unit 101 may set in advance the amount of change so that the light source 10 moves to a given position.

In S104, the preprocessing unit 203 applies preprocessing to the image I(x, y). The preprocessing may reduce the luminance and may also cause overexposure. An image that has undergone preprocessing (an image in which the luminance has been changed) is also referred to as an image I'(x, y).

In S105, the acquisition unit 205 acquires the image in which the luminance has been changed. The addition unit 205 adds the image I'(x, y) to an image $I_{add}$. The image $I_{add}$ designates a composite image. Adding up the images at all the positions produces an image in which the entirety of the photographic subject 20 is captured.

In S106, the control unit 101 determines whether image capturing has been performed for all the positions (x, y). If image capturing has been performed for all the positions (YES in S106), the process proceeds to S107. Otherwise, if image capturing for all the positions has not been completed (NO in S106), the process returns to S102. The operation of S103 may be performed after "NO" is determined in S106.

In S107, the reconstruction processing unit 209 applies reconstruction processing to the image $I_{add}$. In the first embodiment, since the light source 10 is caused to scan, it may take more time than usual to capture an image. However, when the photographic subject 20 is food or the like and is placed on the stage 70, there is no problem even if it takes a reasonable amount of time to capture an image.

In the above processing, image reconstruction processing is applied to the composite image. Here, the linearity of reconstruction processing will be described. Filter processing using a Wiener filter or the like generally satisfies linearity. This is because a Fourier transform satisfies linearity.

The following two processes bring about the same result.

(A) When an image is added earlier, and reconstruction processing is applied to the added image.

(B) When reconstruction processing of an image is applied to the captured image, and then the reconstructed image is added.

If the reconstruction processing unit 109 selects the process (A), reconstruction processing has to be performed only once. This enables the processing time to be reduced.

Figure 17:
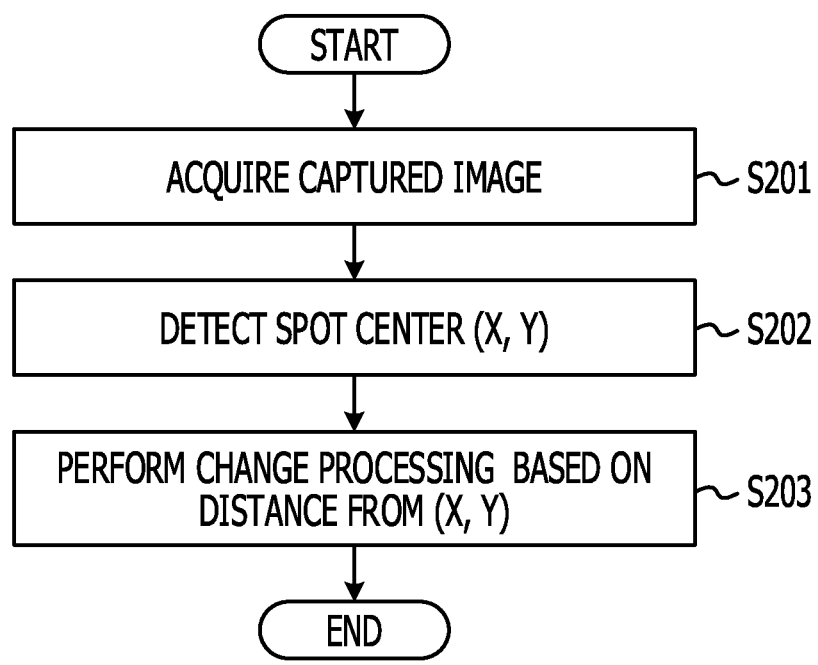
FIG. 17 is a flowchart illustrating example preprocessing in the first embodiment.

Details of the preprocessing will be described next. FIG. 17 is a flowchart illustrating example preprocessing in the first embodiment. In S201 illustrated in FIG. 17, the preprocessing unit 203 acquires a captured image.

In S202, the preprocessing unit 203 detects the spot center (X, Y) on the basis of the luminance of the captured image. The preprocessing unit 203 may detect the spot center by using the center of gravity of luminance or the position having the highest luminance, for example.

In S203, the preprocessing unit 203 performs an operation to change luminance on the basis of the distance from the spot center. For example, it is assumed that the preprocessing unit 203 performs attenuation processing for luminance. At this point, the preprocessing unit 203 multiplies the luminance within the radius R from the spot center by a factor of α (α<1.0).

The preprocessing unit 203 may perform processing in accordance with the distance r to the spot center. The preprocessing unit 203 may perform attenuation processing using the following expression.

$$I'(x, y) = I(x, y)' \frac{r(x, y)}{R} \text{ with } r(x, y) \leq R \quad (11)$$

where R is a constant representing a given distance from the spot center, and is also a constant that determines the range in which luminance are changed. For pixels positioned more inward than R, the luminance decreases in proportion to r.

Besides the above, the preprocessing unit 203 may perform processing as follows.

$$I'(x,y)=0 \text{ with } r(x,y) \leq R \quad (12)$$

The preprocessing unit 203 may simply set the pixels positioned more inward than R to zero. It is possible for the preprocessing unit 203 to apply various types of attenuation processing other than the above.

Here, the reason why the distance r, rather than the luminance, is used as a reference for preprocessing of an image will be described. If reducing luminance is performed on the basis of the luminance, the result of attenuation processing will change because of dependence on the region of the photographic subject 20.

For example, it is assumed that an implementation is performed such that the luminance of an area in which the luminance is 250 or more is set to 0. In this case, for example, when the photographic subject 20 is a living body, whether the luminance reaches the threshold of 250 depends upon whether light is incident upon a skin area (bright) or is incident upon a blood vessel area (dark).

For this reason, it is desirable that the image preprocessing be applied on the basis of the distance from the spot center P1 rather than luminance.

The preprocessing unit 203 may output a plurality of images, for each of which the preprocessing has been changed. For example, the preprocessing unit 203 prepares a plurality of constants, R1 and R2, to use instead of R during processing and may output images to which the plurality of constants are respectively applied.

As described above, a distance closer to the spot center P1 contains information on a shallow position, and a distance farther from P1 contains information on a deep position. Accordingly, changing R at the time of preprocessing enables information from various depths of the same photographic subject 20 to be visualized.

As described above, according to the first embodiment, information about positions deeper than a given depth may be acquired as an image, for a photographic subject exhibiting a light scattering property. According to the first embodiment, adjusting R makes it possible to capture information at a given depth corresponding to R, as an image.

Second Embodiment

An image processing system in a second embodiment will be described next. The second embodiment 2 is, for example, where the image processing system is used as a blood vessel image imaging device or the like. The blood vessel image imaging device captures and displays a blood vessel image by using an image processing system, and for example uses the image to help with an injection.

In the configuration of the image processing system in the second embodiment, the stage 70 is unnecessary among the components of the configuration illustrated in FIG. 12, and the entire photographic subject 20 is scanned by driving the platform 50 or the light source 10.

The hardware of the image processing system in the second embodiment is approximately the same as the hardware illustrated in FIG. 13, and therefore will be described using the same reference numerals. Portions of the hardware that are different from those of the first embodiment will be mainly described below. The stage 70 is not provided in the second embodiment. In the second embodiment, a light source (lighting) that emits line light is used as the light source 10.

For example, in the second embodiment, a line-like light source may be used as lighting. In particular, a combination of a diffraction lattice with a laser, or a combination of a LED with a lens may be used.

Figure 18:
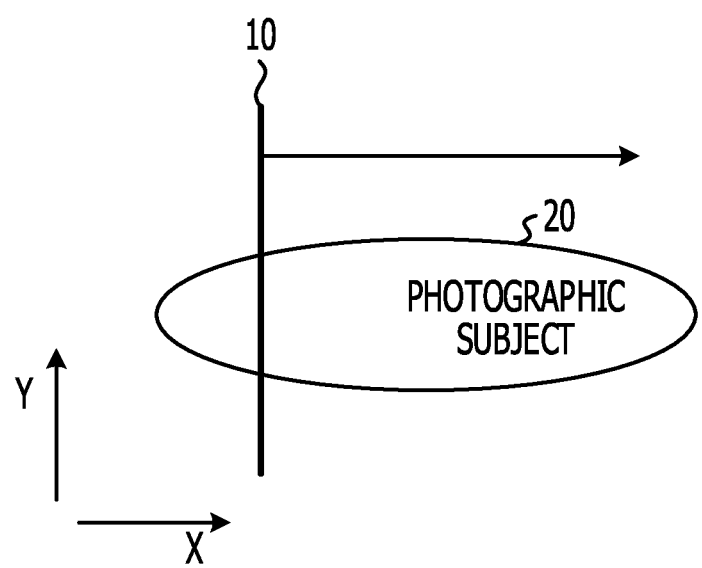
FIG. 18 illustrates an example of a scan by a light source in a second embodiment.

FIG. 18 illustrates an example of a scan by the light source 10 in the second embodiment. In the example illustrated in FIG. 18, the line-like light source 10 is caused to scan in the X direction, thereby enabling illumination of the entire photographic subject 20.

The use of the line-like light source 10 enables imaging time to be shortened. This is because while scanning is performed two-dimensionally when using a light source of spot light, the entire photographic subject is scanned one-dimensionally when using a line-like light source.

When the photographic subject 20 is a person, it is difficult to immobilize the photographic subject 20 for a long time. Accordingly, it is desirable to capture an image by using the line-like light source 10, which has the effect of shortening imaging time.

The driving unit 55 is a rotary motor, for example. The driving unit 55 in the second embodiment 2 drives the line-like light source 10 so as to scan the entire photographic subject 20. Although the driving unit 55 may move the light source 10 in the X direction, the photographic subject 20 is illuminated by changing the direction of illumination, which is performed by the light source 10, by rotation in the second embodiment.

Thus, the entire system may be made smaller. In particular, the driving unit 55 may use a stepping motor, a piezo-motor, or the like.

Figure 19:
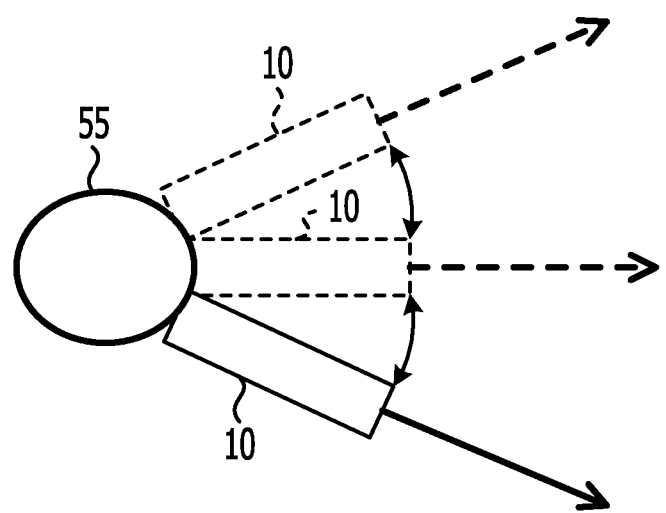
FIG. 19 illustrates an example of using a rotation function to scan illumination light.

FIG. 19 illustrates an example of scanning of illumination light using a rotation function. In the example illustrated in FIG. 19, the rotary motor as the driving unit 55 turns the light source 10, thereby changing the emitting direction.

The image processing device 40 in the second embodiment differs in the function of the control unit 101 from the image processing device 40 in the first embodiment. For example, the control unit 101 in the second embodiment does not perform preprocessing. This is because, in the imaging unit 30, overexposure is applied in correspondence to the operations performed by the preprocessing, so that the effects equivalent to the preprocessing are obtained.

The imaging unit 30 captures an image under the condition that overexposure of luminance occurs at the center position of the light source 10. The range where overexposure occurs may be suitably adjusted. Information that is important in order to obtain the information on the inside of a living body is reflected light from the periphery of the light source 10. Accordingly, the imaging unit 30 makes a setting with which overexposure occurs in a center portion of the light source 10, and then captures an image.

Figure 20:
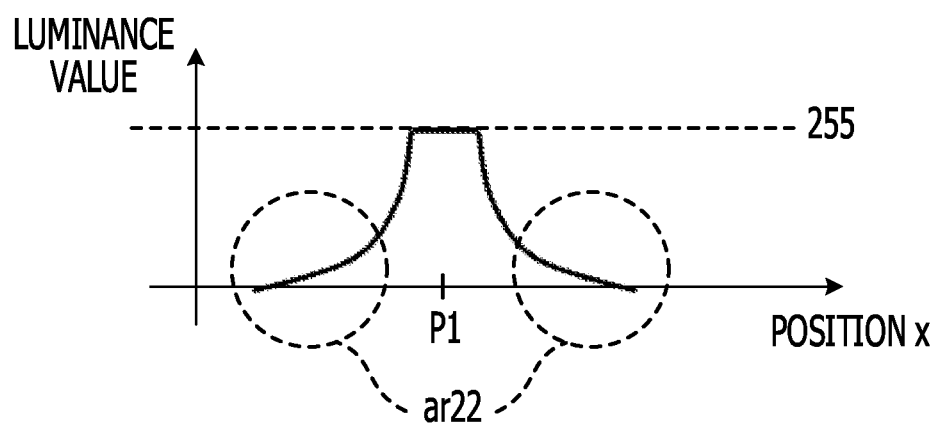
FIG. 20 illustrates an example cross sectional view of a captured image.

FIG. 20 illustrates an example cross-sectional view of a captured image. In the example illustrated in FIG. 20, the imaging unit 30 is set such that overexposure occurs in a center portion of the light source 10 and overexposure of the luminance of the center portion occurs. For example, by using the luminance in the areas ar22 illustrated in FIG. 20, the imaging unit 30 may capture an image of information on a given depth corresponding to a given distance from the center. Causing the occurrence of overexposure has effects of reducing the influence of photons located close to the light source 10, that is, at shallow positions.

Thus, since the captured image output by the imaging unit 30 has been captured in a setting in which overexposure occurs around the center of the light source 10, the captured image is an image in which information for a given depth is captured. Accordingly, in the second embodiment, a preprocessing unit is unnecessary.

The control unit 101 in the second embodiment may perform preprocessing on the captured image as in the first embodiment, if overexposure is not applied in the imaging unit 30.

<Functions>

Figure 21:
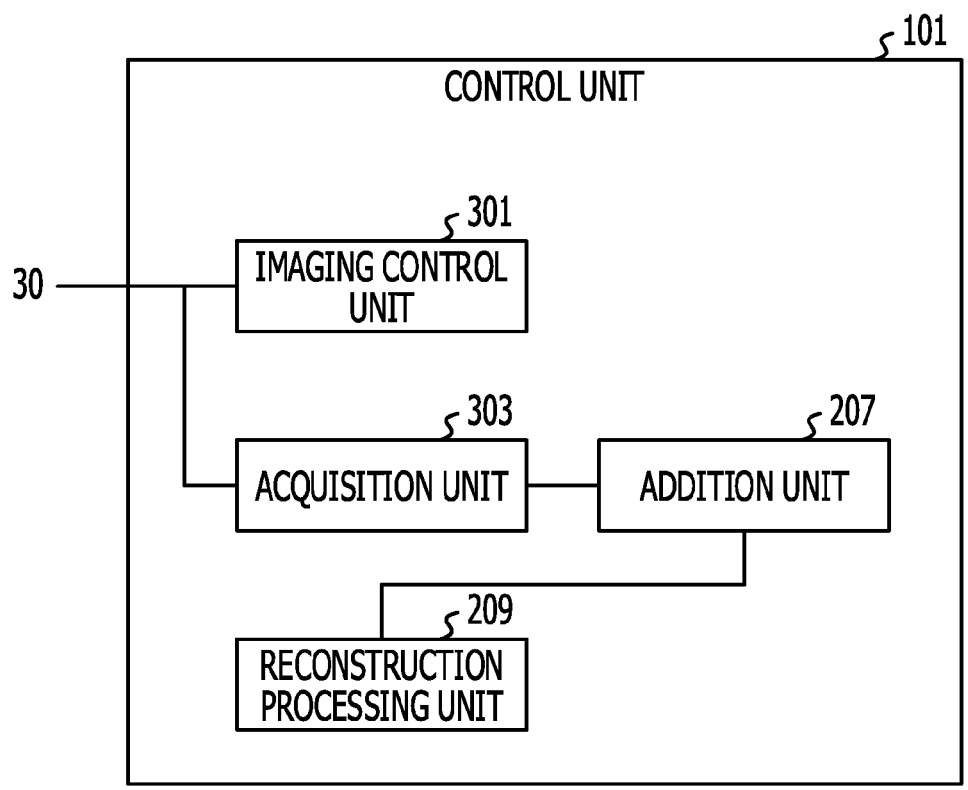
FIG. 21 is a block diagram illustrating an example of functionality of a control unit in the second embodiment.

FIG. 21 is a block diagram illustrating example functions of the control unit 101 in the second embodiment. The control unit 101 illustrated in FIG. 21 includes an imaging control unit 301, an acquisition unit 303, the addition unit 207, and the reconstruction processing unit 209. Among functions in the second embodiment, functions like those in the first embodiment are denoted by the same reference numerals, and description thereof is omitted.

The imaging control unit 301 controls imaging performed by the imaging unit 30. At this point, the imaging control unit 301 controls the imaging unit 30 so that overexposure occurs in the luminance of pixels within a given distance from the center of the light source 10. It is possible to set in advance where the center position of the light source 10 is placed in a captured image.

The acquisition unit 303 acquires a captured image at each position of the light source 10 from the imaging unit 30. A captured image is an image in which overexposure occurs around the center of the light source 10, as illustrated in FIG. 20. The acquisition unit 303 outputs each captured image to the addition unit 207. Processing performed at stages after the addition unit 207 are approximately the same as in the first embodiment.

Having the above functionality enables information on positions deeper than a given depth to be acquired as an image, for a photographic subject exhibiting a light scattering property.

<Operations>

Figure 22:
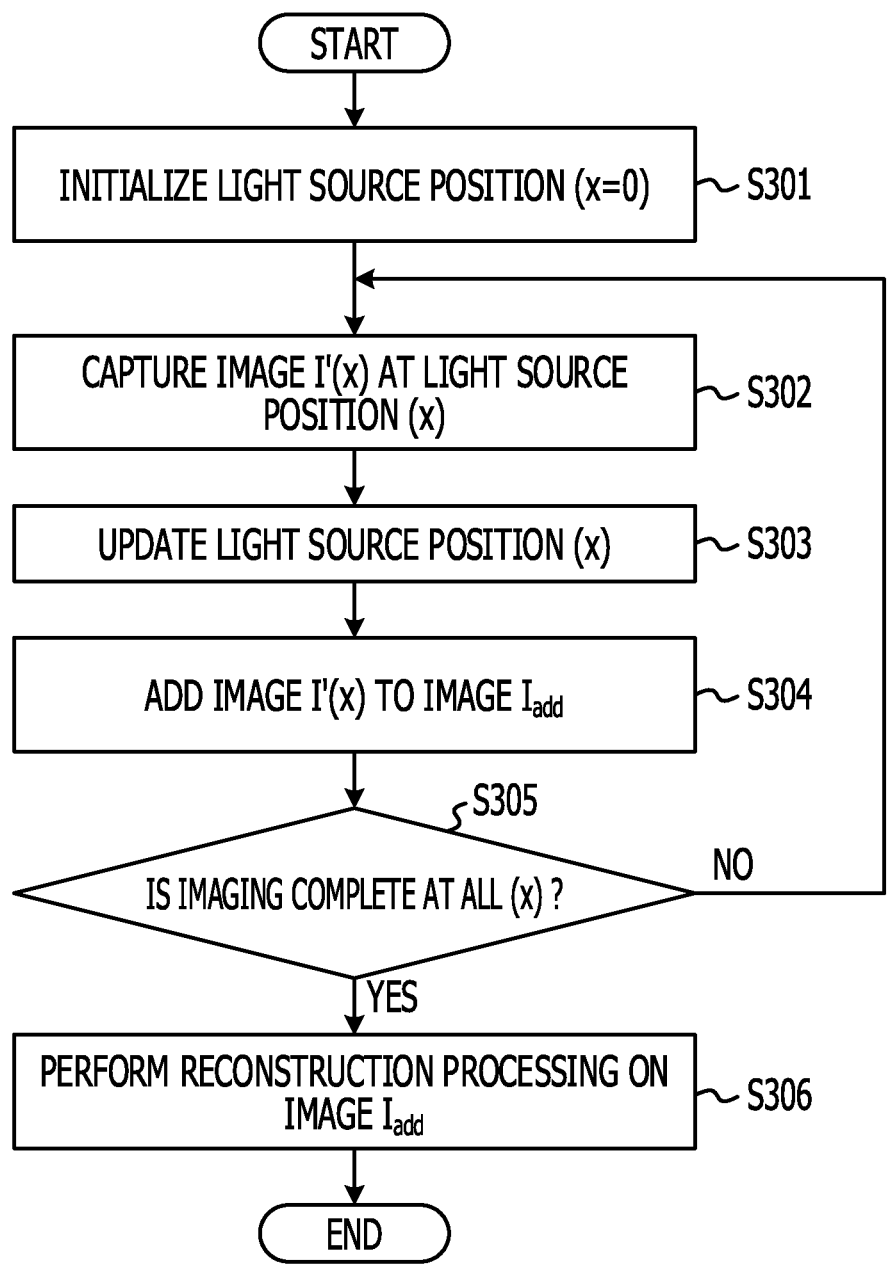
FIG. 22 is a flowchart illustrating example image processing in the second embodiment.

Operations of the image processing system in the second embodiment will be described next. FIG. 22 is a flowchart illustrating example image processing in the second embodiment. In the example illustrated in FIG. 22, a line-like light source is used as the light source 10, and configuration is made so as to cause overexposure in the imaging unit 30.

In S301 illustrated in FIG. 22, the control unit 101 initializes the position of the light source 10. The position of initialization is set to (x=0). In the example illustrated in FIG. 22, since the line-like light source 10 is used, scanning is performed only in the X direction.

In S302, the imaging control unit 301 captures an image I(x) for the position of the light source 10. The photographic subject 20 is illuminated with light from the light source 10. The imaging unit 30 captures an image of diffused reflected light from the photographic subject 20. At this point, the imaging unit 30 generates, from the captured image I(x), an image I'(x) in which overexposure occurs in pixels within the given distance from the center position of the light source 10.

In S303, the control unit 101 updates the position of the light source 10. For example, the control unit 101 sets in advance an amount to update with so that the light source 10 moves to a given position.

In S304, the acquisition unit 303 acquires an image in which the luminance has been changed. The addition unit 205 adds the image I'(x) to the image $I_{add}$.

In S305, the control unit 101 determines whether image capturing has been performed at all the positions (x). If image capturing has been performed for all the locations (YES in S305), the process proceeds to S306. Otherwise, if image capturing for all the locations has not been completed (NO in S305), the process returns to S302. The operation of S303 may be performed after "NO" is determined in S305.

In S306, the reconstruction processing unit 209 performs reconstruction processing on the basis of a line spread function (LSF) on the image $I_{add}$. In the second embodiment, since the light source 10 is caused to perform scanning one-dimensionally, imaging is able to be completed in a shorter time than in the first embodiment.

As described above, according to the second embodiment, the information on positions deeper than a given depth may be acquired as an image, for a photographic subject exhibiting a light scattering property. According to the second embodiment, imaging control processing may be quickly performed by using a line-like light source.

Third Embodiment

An image processing system in a third embodiment will be described next. The third embodiment where the image processing system is used as a biometric authentication device. In particular, in the third embodiment, the image processing system is applied to palm vein authentication and is applied to imaging an intravenous image.

In the configuration of the image processing system in the third embodiment, the stage 70 is unnecessary among the configuration illustrated in FIG. 12. The entire photographic subject 20 is scanned by driving the platform 50 or the light source 10. The configuration of the image processing system in the third embodiment is approximately the same as the configuration of a typical biometric authentication system. However, the type of the light source and the contents of image processing differ from a typical biometric authentication system.

Figure 23:
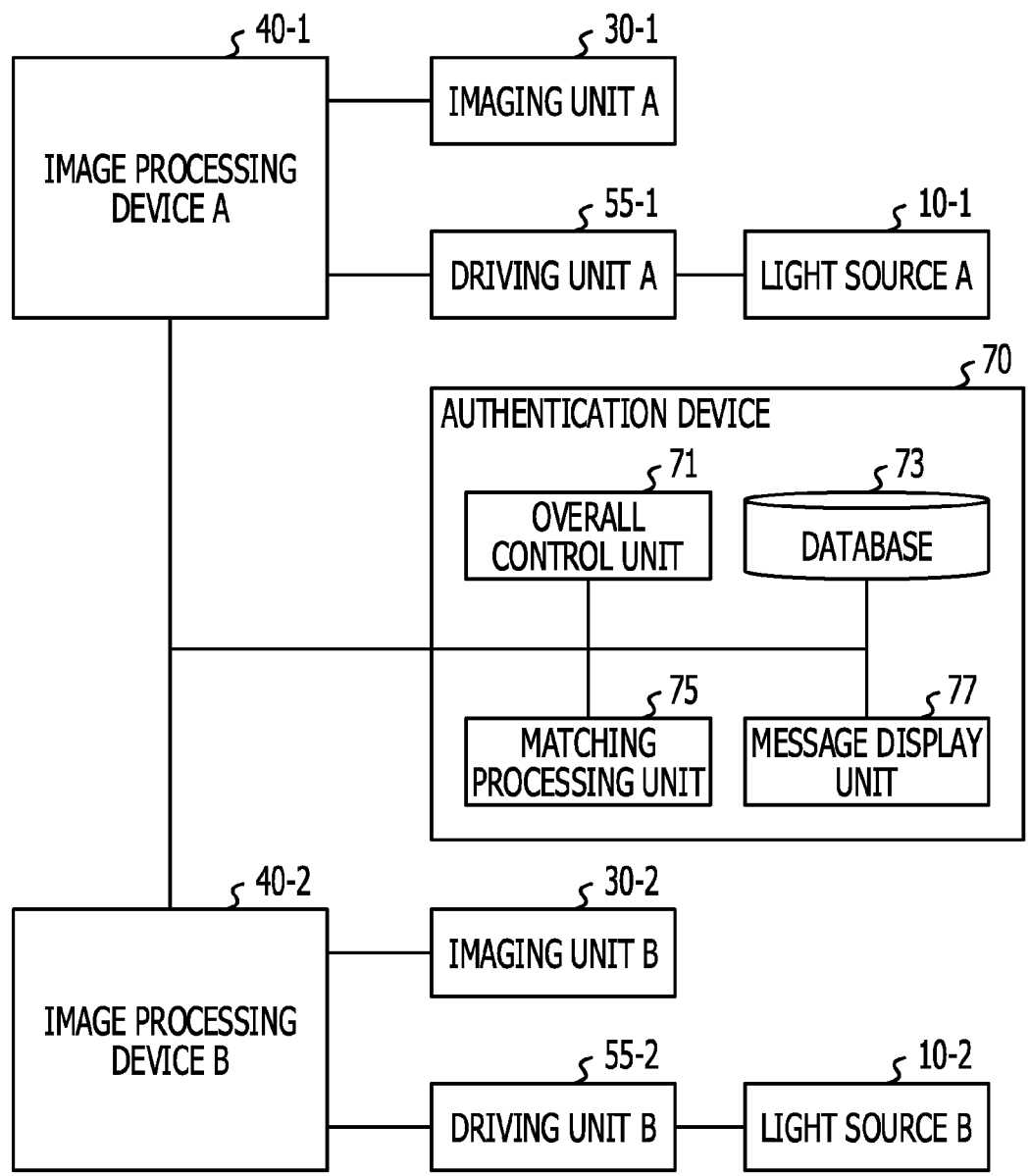
FIG. 23 is a block diagram illustrating example hardware of an image processing system in a third embodiment.

FIG. 23 is a block diagram illustrating example hardware of an image processing system in the third embodiment. In the example illustrated in FIG. 23, regarding the image processing system, a device for registering biometric information (hereafter referred to as a "registration device") includes an image processing device A 40-1, an imaging unit A 30-1, a driving unit A 55-1, and a light source A 10-1. The above units are approximately the same as the units described in the second embodiment. The image of a palm, for example, is captured as the photographic subject 20.

The device for matching biometric information (hereafter also referred to as a "matching device") includes an image processing device B 40-2, an imaging unit B 30-2, a driving unit B 55-2, and a light source B 10-2. The above units are approximately the same as the units described in the second embodiment and also the same as the registration device.

The authentication device 70 includes an overall control unit 71, a database 73, a matching processing unit 75, and a message display unit 77, which are connected through a bus so that they are capable of mutual communication.

The overall control unit 71 controls biometric authentication processing. The database 73 saves biometric information registered by the registration device (hereinafter also referred to as a "registration template") and personal information in association with each other.

The matching processing unit 75 performs matching processing for biometric information. The matching processing unit 75 computes the degree of similarity between the registration template registered in the database 73 and an image captured by the matching device, and determines whether the degree of similarity is greater than or equal to a threshold. The matching processing unit 75 may have a configuration in which the matching processing unit 75 is executed as software by the overall control unit 71.

The message display unit 77 displays a message for biometric authentication processing. For example, the message display unit 77 displays the messages such as "Please hold up your hand" and "Authentication successful".

In the third embodiment, the registration device and the authentication device may not be made of different devices. A configuration in which an image to be registered and an image to be matched are generated by a single device may be adopted. The matching device may have a configuration different to the configuration in the second embodiment. For example, the image to be matched may be captured by using a known configuration in biometric authentication that uses a known technology. In this case, when in the registration device, R is set to be very small or not set, it is possible to support a known matching device.

The image processing device A 40-1 and the image processing device B 40-2 have the same hardware as the image processing device 40 illustrated in FIG. 13.

Figure 24:
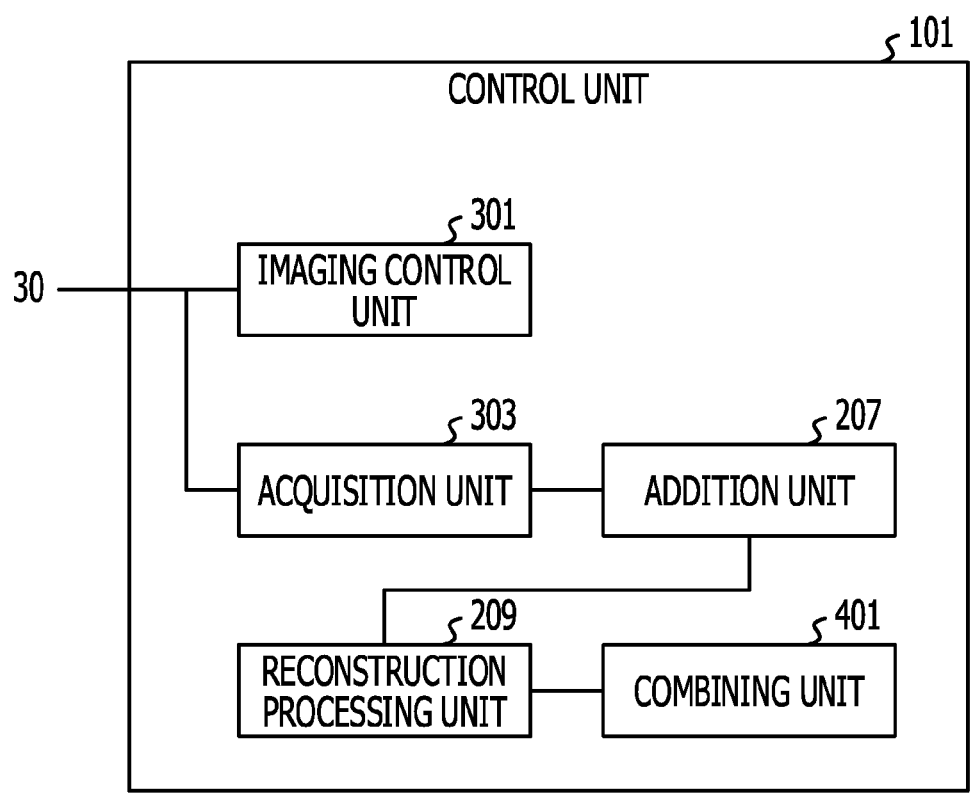
FIG. 24 is a block diagram illustrating an example of functionality of a control unit in the third embodiment.

FIG. 24 is a block diagram illustrating an example of the functionality of the control unit 101 in the third embodiment. The control unit 101 illustrated in FIG. 24 includes the imaging control unit 301, the acquisition unit 303, the addition unit 207, the reconstruction processing unit 209, and a combining unit 401. Among functions in the third embodiment, functions like the functions in the second embodiment are denoted by the same reference numerals, and description thereof is omitted.

The combining unit 401 combines a plurality of output images subjected to image reconstruction processing for respective different given distances R. This makes it possible to generate a composite image of veins near the surface of a palm and veins at a given depth from the surface of the palm. The amount of information used for authentication may be increased and authentication accuracy may be raised.

The combining unit 401 may be unnecessary, and may be provided in order to increase the authentication accuracy of biometric authentication. The image combined by the combining unit 401 or the image reconstructed by the reconstruction processing unit 209 are output to the matching processing unit 75.

The matching processing unit 75 extracts a portion of the characteristic (for example, palm veins) of an image from the composite image or the reconstructed image. Hereinafter, the image of a portion of the characteristic is also referred to as an "image of the characteristic". If the image of the characteristic is data to be registered, the matching processing unit 75 writes the image of the characteristic together with the user ID in association with each other into the database 73. In this case, the image of the characteristic registered in the database 73 is a registered template.

Thus, a characteristic extracted from an image in which information on the given depth is captured or a characteristic extracted from an image obtained by combining images in which information on different depths is captured may be registered as a registration template.

Also in the third embodiment, if the given distance R is set to 0 or to be a minute distance, it is possible to capture an image of the vein near the palm surface. The control unit 101 prepares a plurality of given distances R, and may obtain a captured image in which information on depths corresponding to the respective given distances R is captured.

Figure 25:
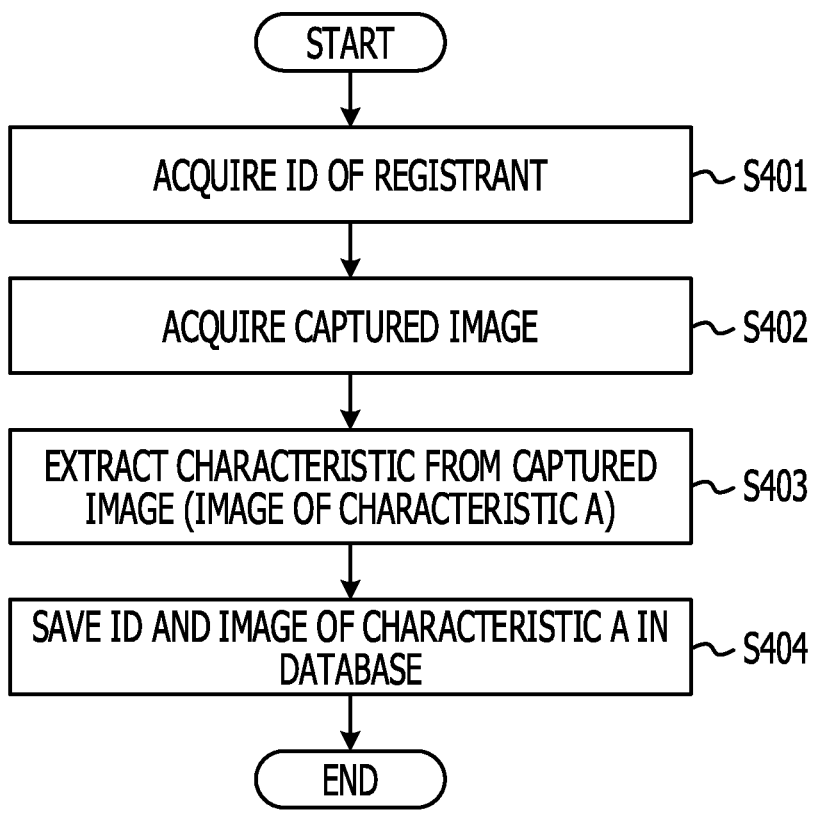
FIG. 25 is a flowchart illustrating example biometric information registration processing in the third embodiment.

Operations of the image processing system in the third embodiment will be described next. FIG. 25 is a flowchart illustrating example image processing (biometric information registration processing) in the third embodiment. Although the imaging control processing in the third embodiment uses processing described in the second embodiment, processing described in the first embodiment may be used.

In S401 illustrated in FIG. 25, the image processing device A 40-1 acquires a registrant's ID. A registrant's ID, such as a registrant's identification number or a name, is information by which the registrant is identified from others.

In S402, the image processing device A 40-1 acquires a captured image. At this point, the image processing device A 40-1 acquires an image in which image reconstruction processing has been performed, or the combined image, as a captured image. The image processing device A 40-1 transmits the captured image and the registrant's ID to the authentication device 70.

In S403, the matching processing unit 75 extracts a portion of the characteristic from the captured image. The image of the characteristic extracted at this point is referred to as an "image of the characteristic A".

In S404, the matching processing unit 75 saves the registrant's ID and the image of the characteristic A in association with each other in the database 73.

Thus, a characteristic extracted from an image in which information on the given depth is captured or a characteristic extracted from an image obtained by combining images in which information on different depths is captured may be registered as a registration template.

Figure 26:
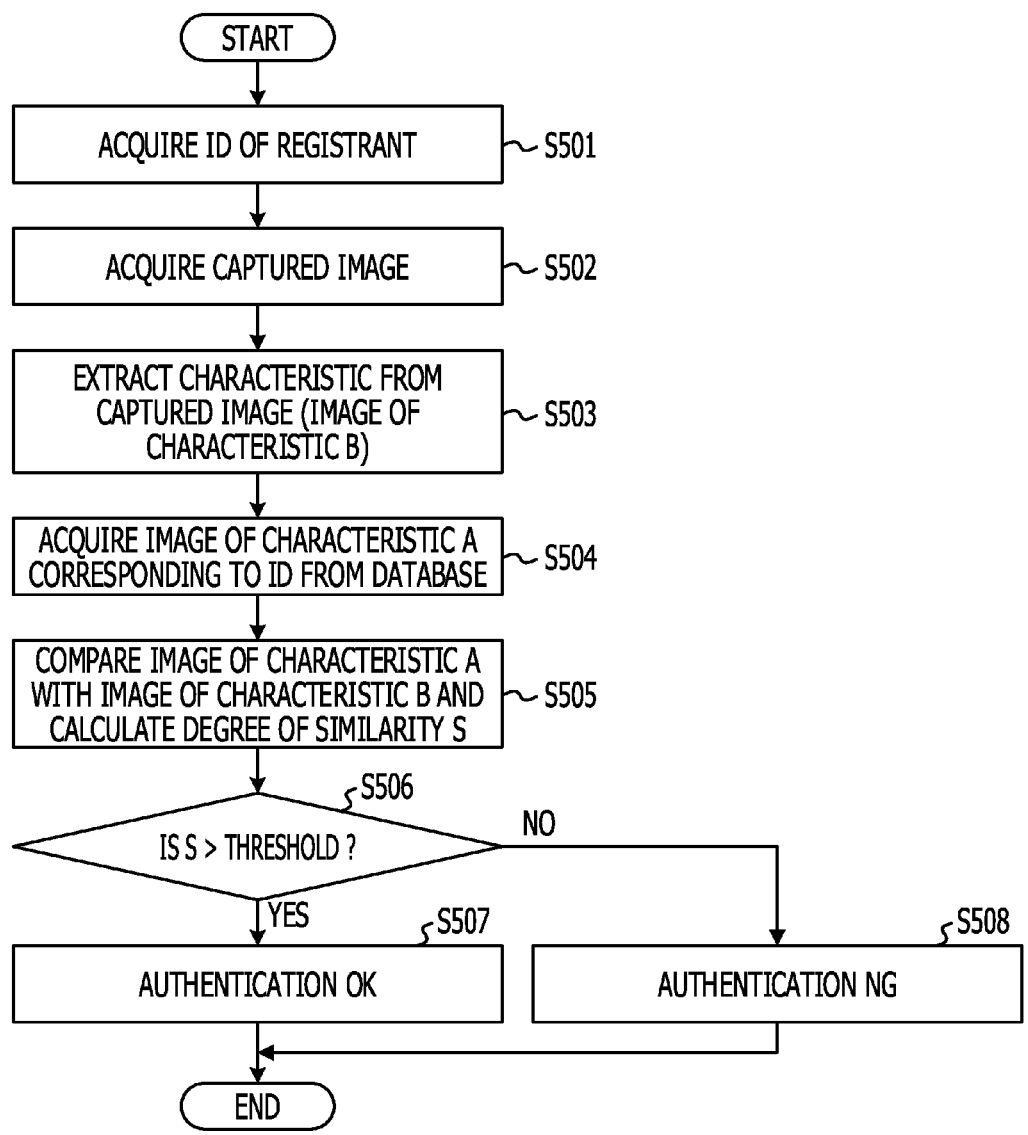
FIG. 26 is a flowchart illustrating example biometric information matching processing in the third embodiment.

FIG. 26 is a flowchart illustrating example image processing (biometric information matching processing) according to the third embodiment.

In S501 illustrated in FIG. 26, the image processing device B 40-2 acquires a registrant's ID. A registrant's ID, such as a registrant's identification number or a name, is information by which the registrant is identified from other people.

In S502, the image processing device B 40-2 acquires a captured image. At this point, the image processing device B 40-2 acquires an image in which image reconstruction processing has been performed, or a combined image, as a captured image. The image processing device B 40-2 transmits the captured image and the registrant's ID to the authentication device 70.

In S503, the matching processing unit 75 extracts a portion of the characteristic from the captured image. The image of the characteristic extracted at this point is referred to as an "image of the characteristic B".

In S504, the matching processing unit 75 acquires the image of the characteristic A corresponding to an authentication target's ID from the database 73.

In S505, the matching processing unit 75 compares the image of the characteristic A with the image of the characteristic B, and calculates the degree of similarity S.

In S506, the matching processing unit 75 determines whether the degree of similarity S is greater than a threshold. If the degree of similarity S is greater than the threshold (YES in S506), the process proceeds to S507. Otherwise, if the degree of similarity S is less than or equal to the threshold (NO in S506), the process proceeds to S508. The threshold may be set in advance to an appropriate value using an experiment or the like.

In S507, the message display unit 77 displays a message indicating that authentication succeeded on a display screen. In S508, the message display unit 77 displays a message indicating that authentication failed on the display screen.

As described above, according to the third embodiment, biometric authentication processing may be performed by using information for the given depth from the surface of a photographic subject. Moreover, according to the third embodiment, combining images in which information for different depths is captured enables the amount of information used for authentication to be increased, thereby improves authentication accuracy.

[Modifications]

Modifications to the above embodiments will be described next. For example, in each of the above embodiments, the configuration in which the imaging unit 30 is fixed and the light source 10 is driven is used. This is because fixing the imaging unit 30 enables a stable image to be acquired.

In contrast, a configuration in which the light source 10 is fixed and the imaging unit 30 is driven may be used as a configuration for the image processing system for acquiring the same effect as in the embodiments.

In the above embodiments, a spot light source and a line-like light source are used. The reason why the spot light source is used is that the spot light source enables a signal from a deeper position than that when using diffusion lighting to be obtained.

Figure 27:
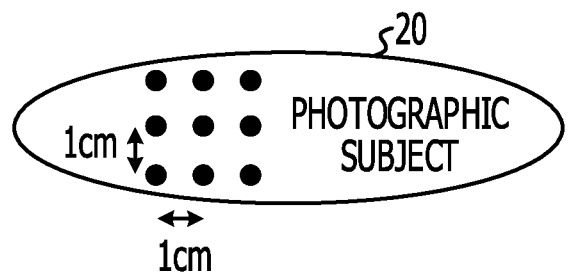
FIG. 27 illustrates an example variation of a lighting shape.

On the other hand, with the spot light source, it takes time to scan the entire region of the photographic subject. Accordingly, using lighting that illuminates a plurality of spots in a lattice manner as the shape of lighting may be applied. FIG. 27 illustrates an example variation of the lighting shape. As illustrated in FIG. 27, an image may be captured in a short time by driving lighting that uses lattice-like spot lighting. When spot light sources are arranged in the shape of a lattice, given gaps are implemented in order to avoid interference with the next light. The given gap is 1 cm, for example.

The method of reconstruction processing of an image is not limited to a Wiener filter, as described in the above embodiments. As a specific scheme for image reconstruction processing, a Lucy Richardson filter and so forth are known in addition to the Wiener filter.

A Wiener filter in which a Fourier transform is applied and image reconstruction processing is performed in the frequency domain generally has a noise-sensitive property. This is because when noise rides in the frequency domain, noise also sometimes rides on an extensive range of the original image after reconstruction.

In contrast, the Lucy Richardson filter is a scheme that uses Bayesian estimation, not a Fourier transform, and therefore has the property in which the Lucy Richardson filter is resistant to noise.

In each of the above embodiments, a laser may be used as the light source. However, in each embodiment, the light source is not limited to a laser. For example, in each embodiment, the configuration in which light of a LED, a halogen lamp, and so forth is condensed by using a lens or the like may be used. Thereby, regarding the light source, a configuration that is generally at lower cost than in the configuration that uses a laser may be adopted.

The configuration using the stage in the X and Y directions as the driving mechanism is used in each embodiment. However, a device configuration in which the emission direction of light is changed as the drive mechanism may be adopted, rather than the XY stage. When the scheme of changing the emission direction of light is adopted, it may be possible to downsize the device itself.

As a scheme for scanning of a light source, a configuration in which a laser or the like as the light source itself is fixed and emits light, and scanning by using illumination light is performed by using a MEMS mirror or a galvanomirror. The camera used as the imaging unit is a high dynamic range (HDR) camera, for example.

A program for implementing image processing that includes imaging control processing described in the foregoing embodiments is recorded on a recording medium, so that processing described in the embodiments may be performed by a computer.

For example, it is also possible to implement the foregoing processing by recording the program on a recording medium, and causing a computer, a portable terminal, a smartphone, a tablet terminal, or the like to read the recording medium.

As the recording medium, various types of recording media including recording media that optically, electrically or magnetically record information, such as a CD-ROM, a flexible disk, and a magneto-optical disc, and semiconductor memories that electrically records information, such as a ROM and a flash memory, may be used. The recording medium does not include a temporary medium, such as carrier waves.

As described above, although the image processing device and the program have been described in detail, the present disclosure is not limited to a specific embodiment, and various modifications and changes may be made without departing from the scope described in the claims. It is also possible to combine all or a plurality of elements of the foregoing embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device, comprising:
   a memory; and
   a processor coupled to the memory and configured to:
   acquire a plurality of images of reflected light reflected from a photographic subject by changing an incident position indicating a location at which light is incident from a light source to the photographic subject, each of the plurality of images including a plurality of pixels;
   correct the plurality of images by changing luminance of the plurality of pixels for each of the plurality of images, a changing rate of luminance of pixels within a given distance from a point on an image corresponding to the incident position being larger than a changing rate of remaining pixels among the plurality of pixels;
   generate a composite image by adding together each of the plurality of corrected images; and
   generate an output image by performing image restoration on the composite image by using a point spread function determined based on a spot shape detected from an image of the reflected light.

2. The image processing device according to claim 1, wherein the captured images are images output from a camera that changes the luminance of the pixels within the given distance to cause overexposure.

3. The image processing device according to claim 1, wherein the processor is configured to acquire each of the captured images by reducing the luminance of the pixels within the given distance of the image in which the light reflected from the photographic subject is captured.

4. The image processing device according to claim 3, wherein the processor is configured to generate the plurality of corrected images by controlling so as not to reduce the luminance of the pixels whose distance from the entrance position is larger than the given distance.

5. The image processing device according to claim 1, wherein the processor is configured to acquire each of the captured images under a condition that overexposure of luminance occurs at the center position of the light source.

6. The image processing device according to claim 1, wherein the light source emits spot light.

7. The image processing device according to claim 1, wherein the point spread function is adjusted when a distance from the photographic subject to a camera coupled to the image processing device is variable, the camera being configured to capture the plurality of images of reflected light, and the point spread function is set to be a fixed value when the distance is not variable.

8. The image processing device according to claim 1, wherein the processor is configured to generate a composite image by compositing a plurality of the output images generated at respectively different given distances.

9. The image processing device according to claim 1, wherein the processor is configured to detect the entrance position by using a distribution of luminance of the plurality of pixels.

10. The image processing device according to claim 1, wherein the light source emits line light.

11. An image processing system, comprising:
a memory;
a processor coupled to the memory and configured to:
acquire a plurality of images of reflected light reflected from a photographic subject by changing an incident position indicating a location at which light is incident from a light source to the photographic subject, each of the plurality of images including a plurality of pixels;
correct the plurality of images by changing luminance of the plurality of pixels for each of the plurality of images, a changing rate of luminance of pixels within a given distance from a point on an image corresponding to the incident position being larger than a changing rate of remaining pixels among the plurality of pixels;
generate a composite image by adding together each of the plurality of corrected images; and
generate an output image by performing image restoration on the composite image by using a point spread function determined based on a spot shape detected from an image of the reflected light, and
a display configured to display the output image.

12. An image processing method executed by a computer, comprising:
acquiring a plurality of images of reflected light reflected from a photographic subject by changing an incident position indicating a location at which light is incident from a light source to the photographic subject, each of the plurality of images including a plurality of pixels;
correcting the plurality of images by changing luminance of the plurality of pixels for each of the plurality of images, a changing rate of luminance of pixels within a given distance from a point on an image corresponding to the incident position being larger than a changing rate of remaining pixels among the plurality of pixels;
generating a composite image by adding together each of the plurality of corrected images; and
generating an output image by performing image restoration on the composite image by using a point spread function determined based on a spot shape detected from an image of the reflected light.

13. A non-transitory computer-readable recording medium storing a program that causes a computer to execute a process, the process comprising:
acquiring a plurality of images of reflected light reflected from a photographic subject by changing an incident position indicating a location at which light is incident from a light source to the photographic subject, each of the plurality of images including a plurality of pixels;
correcting the plurality of images by changing luminance of the plurality of pixels for each of the plurality of images, a changing rate of luminance of pixels within a given distance from a point on an image corresponding to the incident position being larger than a changing rate of remaining pixels among the plurality of pixels;
generating a composite image by adding together each of the plurality of corrected images; and
generating an output image by performing image restoration on the composite image by using a point spread function determined based on a spot shape detected from an image of the reflected light.

* * * * *